(12) United States Patent
Patil et al.

(10) Patent No.: US 9,439,039 B1
(45) Date of Patent: Sep. 6, 2016

(54) DEVICE-TO-DEVICE RANGING AND POSITIONING

(71) Applicant: QUALCOMM Incorporated, San Diego, CA (US)

(72) Inventors: Shailesh Patil, Raritan, NJ (US); Libin Jiang, Bridgewater, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 14/820,414

(22) Filed: Aug. 6, 2015

(51) Int. Cl.
*H04W 4/02* (2009.01)
*H04W 92/18* (2009.01)

(52) U.S. Cl.
CPC ............. *H04W 4/023* (2013.01); *H04W 92/18* (2013.01)

(58) Field of Classification Search
CPC .......... G01S 19/05; G01S 19/28; G01S 5/10; H04W 4/02; H04W 60/04; H04W 48/16; H04W 64/00; H04W 4/025; H04W 8/005; H04H 20/71; H04L 63/0892

USPC .......................... 455/456.2, 456.1, 437, 3.01
See application file for complete search history.

(56) References Cited

U.S. PATENT DOCUMENTS

2012/0021748 A1* 1/2012 Ostrup .............. H04W 36/0061
455/437

* cited by examiner

*Primary Examiner* — Phuoc H Doan
(74) *Attorney, Agent, or Firm* — Arent Fox LLP

(57) ABSTRACT

A method, an apparatus, and a computer program product for wireless communication are provided. The apparatus may be an eNB. The apparatus may be configured to receive a first message from a UE. The first message may include at least one of a first request to participate in D2D positioning or a second request to participate in D2D ranging. The apparatus may be configured to determine at least one of whether to allow the UE to participate in D2D positioning or whether to allow the UE to participate in D2D ranging based on the received first message. The apparatus may be configured to transmit a second message to the UE based on the determination.

30 Claims, 17 Drawing Sheets

DEVICE-TO-DEVICE RANGING AND POSITIONING

BACKGROUND

1. Field

The present disclosure relates generally to communication systems, and more particularly, to a device-to-device (D2D) ranging and positioning in a wireless network.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be a base station. The base station may receive a first message from a user equipment (UE). The first message may include at least one of a first request to participate in D2D positioning or a second request to participate in D2D ranging. The base station may determine at least one of whether to allow the UE to participate in D2D positioning or whether to allow the UE to participate in D2D ranging based on the received first message. The base station may transmit a second message to the UE based on the determination.

In another aspect, an apparatus with means for performing various functions is provided. The apparatus may include means for receiving a first message from a UE. The first message may include at least one of a first request to participate in D2D positioning or a second request to participate in D2D ranging. The apparatus may include means for determining at least one of whether to allow the UE to participate in D2D positioning or whether to allow the UE to participate in D2D ranging based on the received first message. The apparatus may include means for transmitting a second message to the UE based on the determination. The apparatus may include means for transmitting a resource message that indicates at least one of a first set of resources for D2D positioning or a second set of resources for D2D ranging. In an aspect, the at least one of the first request to participate in D2D positioning or the second request to participate in D2D ranging may include a mode request to participate in D2D positioning or D2D ranging while the UE is in a connected mode or in an idle mode. In one configuration, the means for determining the at least one of whether to allow the UE to participate in D2D positioning or whether to allow the UE to participate in D2D ranging may be configured to perform one or more of determining whether to allow the UE to participate in D2D positioning while the UE is in at least one of the connected mode or the idle mode or determining whether to allow the UE to participate in D2D ranging while the UE is in at least one of the connected mode or the idle mode. In another configuration, the means for determining the at least one of whether to allow the UE to participate in D2D positioning or whether to allow the UE to participate in D2D ranging may be configured to determine whether the UE is only allowed to listen to D2D positioning signals and to determine whether the UE is allowed to transmit D2D positioning signals. In another aspect, the UE may be allowed to transmit D2D positioning signals, and the second message may indicate a subset of resources for transmitting the D2D positioning signals. In another aspect, the second message may indicate a type of sequence for D2D positioning. In another configuration, the apparatus may include means for transmitting a third message to the second UE based on the determination to allow the UE to participate in D2D ranging with the second UE. In this aspect, the second request to participate in D2D ranging may include an identifier associated with a second UE. In another configuration, the apparatus may include means for determining one or more of a first subset of resources allocated to the UE to initiate D2D ranging or a second subset of resources allocated to the second UE to initiate D2D ranging based on the determination to allow the UE to participate in D2D ranging. In another aspect, the second message may include one or more of the first subset of resources or the second subset of resources for D2D ranging. In another aspect, the third message may include the second subset of resources for D2D ranging. In another aspect, at least one of the second message or the third message may indicate a type of sequence for D2D ranging.

In another aspect, a computer-readable medium storing computer executable code for wireless communication is provided. The computer-readable medium may include code for receiving a first message from a UE. The first message may include at least one of a first request to participate in D2D positioning or a second request to participate in D2D ranging. The computer-readable medium may include code for determining at least one of whether to allow the UE to participate in D2D positioning or whether to allow the UE to participate in D2D ranging based on the received first message. The computer-readable medium may include code for transmitting a second message to the UE based on the determination. In another configuration, the computer-readable medium may include code for transmitting a resource message that indicates at least one of a first set of resources for D2D positioning or a second set of resources for D2D ranging. In an aspect, the at least one of the first request to participate in D2D positioning or the second request to participate in D2D ranging may include a mode request to participate in D2D positioning or D2D ranging while the UE is in a connected mode or in an idle mode. In another configuration, the code for determining the at least one of whether to allow the UE to participate in D2D positioning or whether to allow the UE to participate in D2D ranging may include code for one or more of determining whether to allow the UE to participate in D2D positioning while the UE is in at least one of the connected mode or the idle mode or determining whether to allow the UE to participate in D2D ranging while the UE is in at least one of the connected mode or the idle mode. In another configuration, the code for determining the at least one of whether to allow the UE to participate in D2D positioning or whether to allow the UE to participate in D2D ranging may include code for determining whether the UE is only allowed to listen to D2D positioning signals and for determining whether the UE is allowed to transmit D2D positioning signals. In another aspect, the UE may be allowed to transmit D2D positioning signals, and the second message may indicate a subset of resources for transmitting the D2D positioning signals. In another aspect, the second message may indicate a type of sequence for D2D positioning. In another configuration, the computer-readable medium may include code for transmitting a third message to the second UE based on the determination to allow the UE to participate in D2D ranging with the second UE. In this configuration, the second request to participate in D2D ranging may include an identifier associated with a second UE. In another configuration, the computer-readable medium may include code for determining one or more of a first subset of resources allocated to the UE to initiate D2D ranging or a second subset of resources allocated to the second UE to initiate D2D ranging based on the determination to allow the UE to participate in D2D ranging. In an aspect, the second message may include one or more of the first subset of resources or the second subset of resources for D2D ranging. In another aspect, the third message may include the second subset of resources for D2D ranging. In another aspect, at least one of the second message or the third message may indicate a type of sequence for D2D ranging.

In another aspect of the disclosure, a method, a computer program product, and an apparatus are provided. The apparatus may be a UE. The apparatus may transmit a first message that includes at least one of a first request to participate in D2D positioning within a first set of resources for D2D positioning or a second request to participate in D2D ranging within a second set of resources for D2D ranging. The apparatus may receive a second message, based on the transmitted first message, indicating at least one of whether the apparatus is allowed to participate in D2D positioning or whether the apparatus is allowed to participate in D2D ranging. The apparatus may perform at least one of a D2D positioning or a D2D ranging based on the received second message.

In another aspect, an apparatus with means for performing various functions is provided. The apparatus may include means for transmitting a first message that includes at least one of a first request to participate in D2D positioning within a first set of resources for D2D positioning or a second request to participate in D2D ranging within a second set of resources for D2D ranging. The apparatus may include means for receiving a second message, based on the transmitted first message, indicating at least one of whether the apparatus is allowed to participate in D2D positioning or whether the apparatus is allowed to participate in D2D ranging. The apparatus may include means for performing at least one of a D2D positioning or a D2D ranging based on the received second message. The apparatus may include means for receiving a resource message that indicates at least one of the first set of resources for D2D positioning or the second set of resources for D2D ranging. In an aspect, the at least one of the first request to participate in D2D positioning or the second request to participate in D2D ranging may include a mode request to participate in D2D positioning or D2D ranging while the apparatus is in a connected mode or in an idle mode. In another aspect, the second message may indicate one or more of a subset of the first set of resources for D2D positioning or a subset of the second set of resources for D2D ranging. In another aspect, the subset of the second set of resources for D2D ranging may include a first group of resources allocated to the apparatus for initiating D2D ranging and a second group of resources allocated to a second UE for initiating D2D ranging. In another configuration, the apparatus may include means for transmitting a second resource message to the second UE indicating the second group of resources allocated to the second UE for initiating D2D ranging. In another aspect, the second message may indicate a type of sequence for D2D ranging.

In another aspect, a computer-readable medium storing computer executable code for wireless communication is provided. The computer-readable medium may be associated with a UE. The computer-readable medium may include code for transmitting a first message that may include at least one of a first request to participate in D2D positioning within a first set of resources for D2D positioning or a second request to participate in D2D ranging within a second set of resources for D2D ranging. The computer-readable medium may include code for receiving a second message, based on the transmitted first message, indicating at least one of whether the UE is allowed to participate in D2D positioning or whether the UE is allowed to participate in D2D ranging. The computer-readable medium may include code for performing at least one of a D2D positioning or a D2D ranging based on the received second message. In another configuration, the computer-readable medium may include code for receiving a resource message that may indicate at least one of the first set of resources for D2D positioning or the second set of resources for D2D ranging. In an aspect, the at least one of the first request to participate in D2D positioning or the second request to participate in D2D ranging may include a mode request to participate in D2D positioning or D2D ranging while the UE is in a connected mode or in an idle mode. In another aspect, the second message may indicate one or more of a subset of the first set of resources for D2D positioning or a subset of the second set of resources for D2D ranging. In another aspect, the subset of the second set of resources for D2D ranging may include a first group of resources allocated to the UE for initiating D2D ranging and a second group of resources allocated to a second UE for initiating D2D ranging. In another configuration, the computer-readable medium may include code for transmitting a second resource message to the second UE indicating the second group of resources allocated to the second UE for initiating D2D ranging. In another aspect, the second message may indicate a type of sequence for D2D ranging.

DETAILED DESCRIPTION

Figure 1:
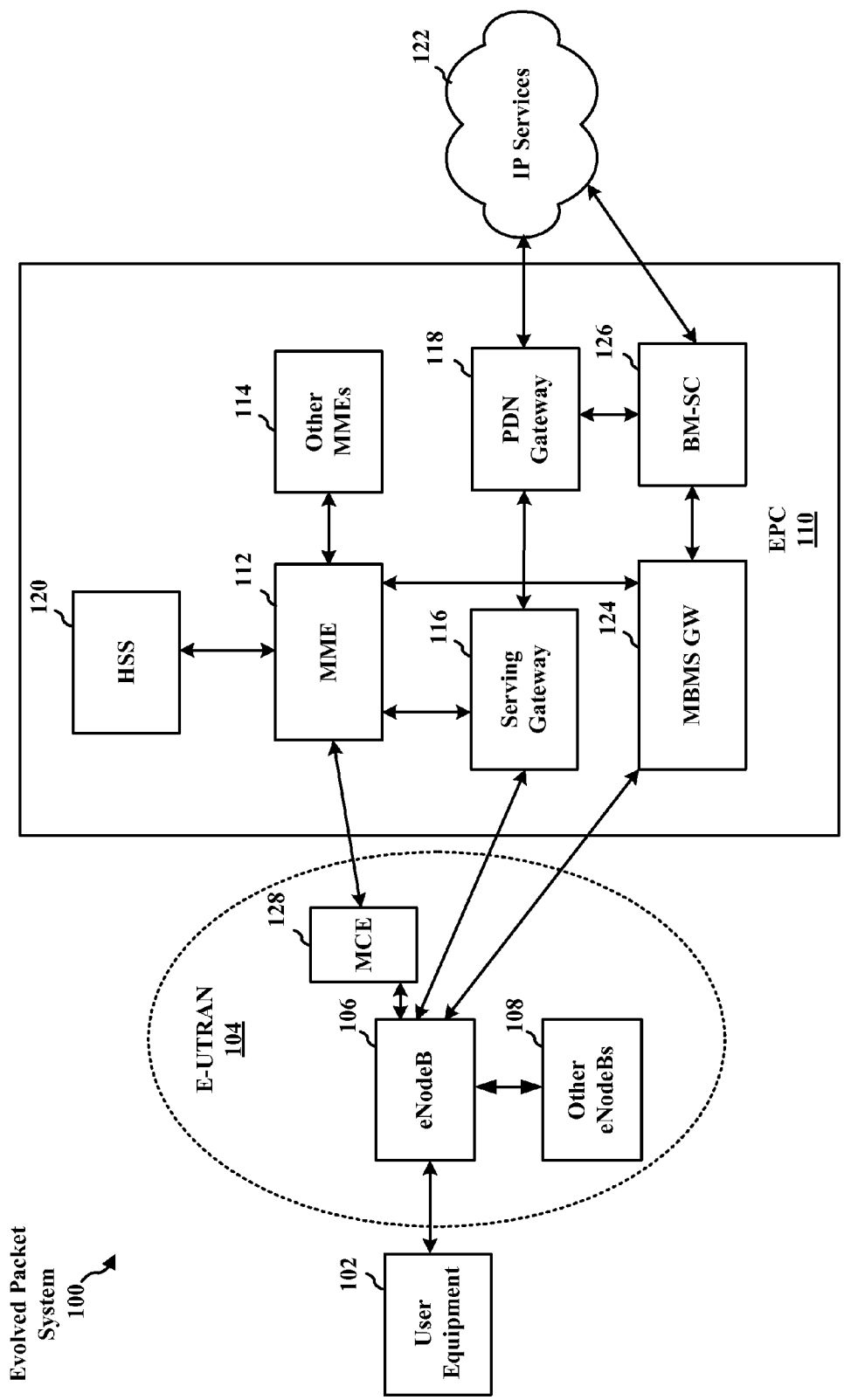
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
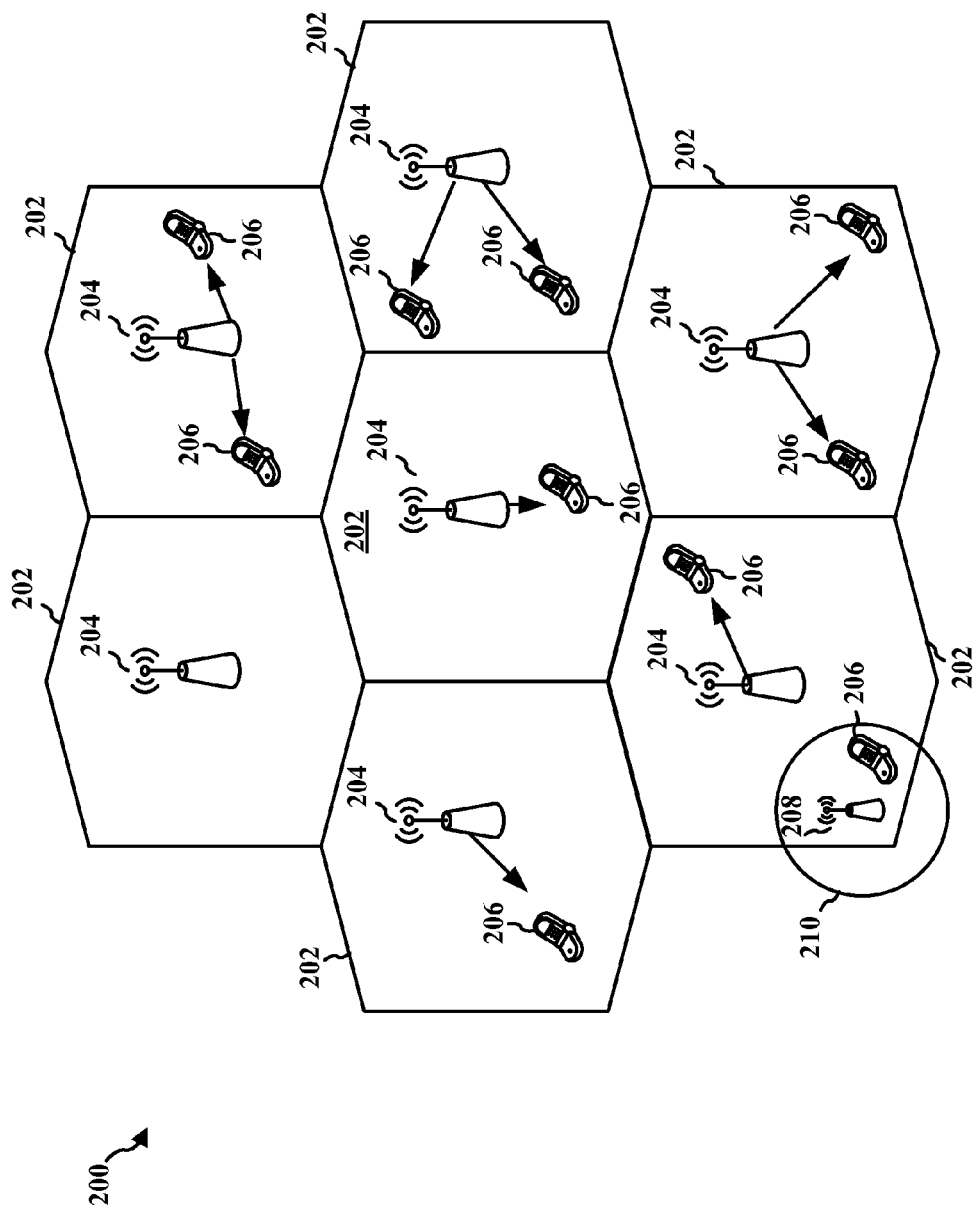
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
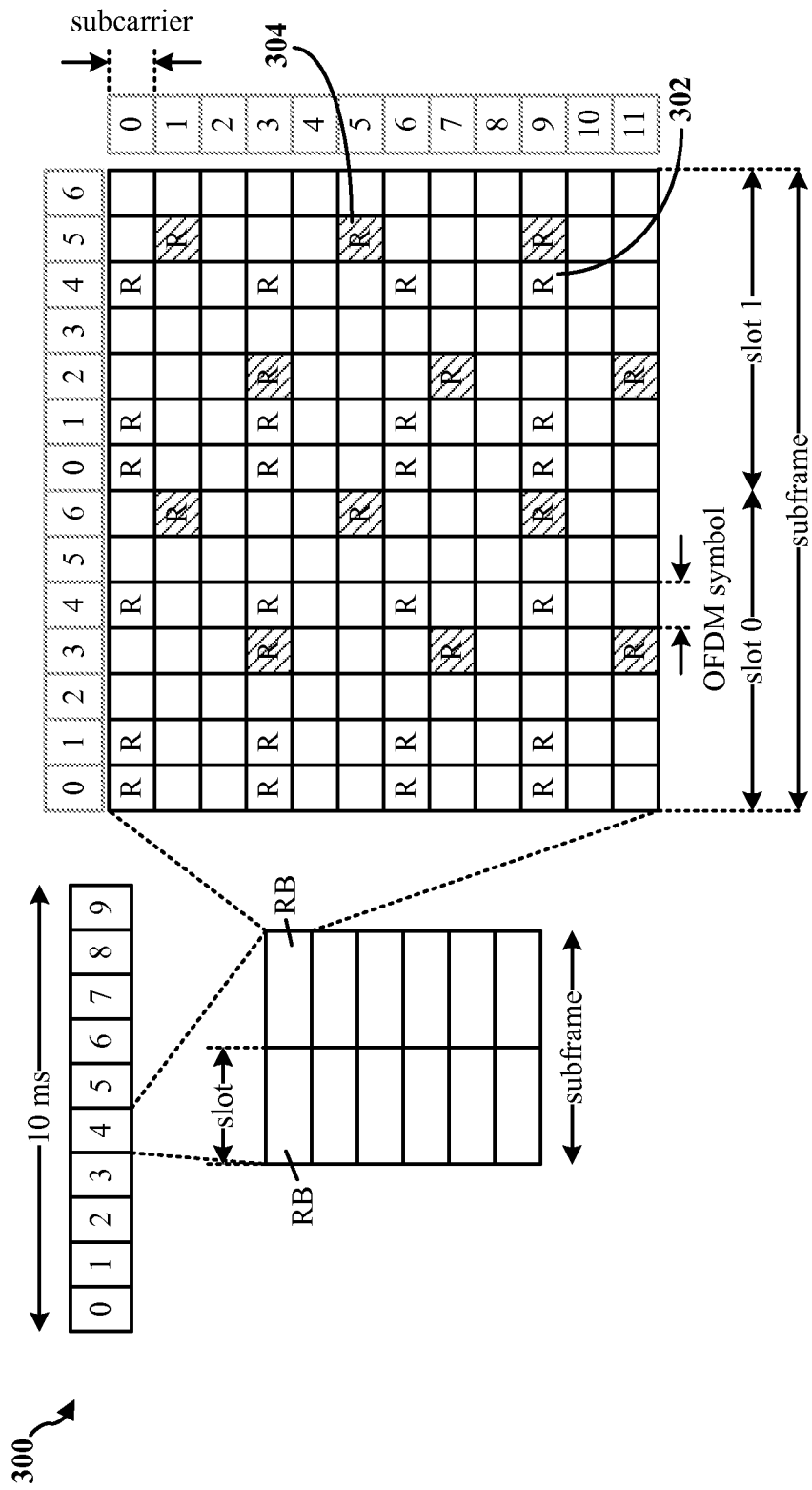
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
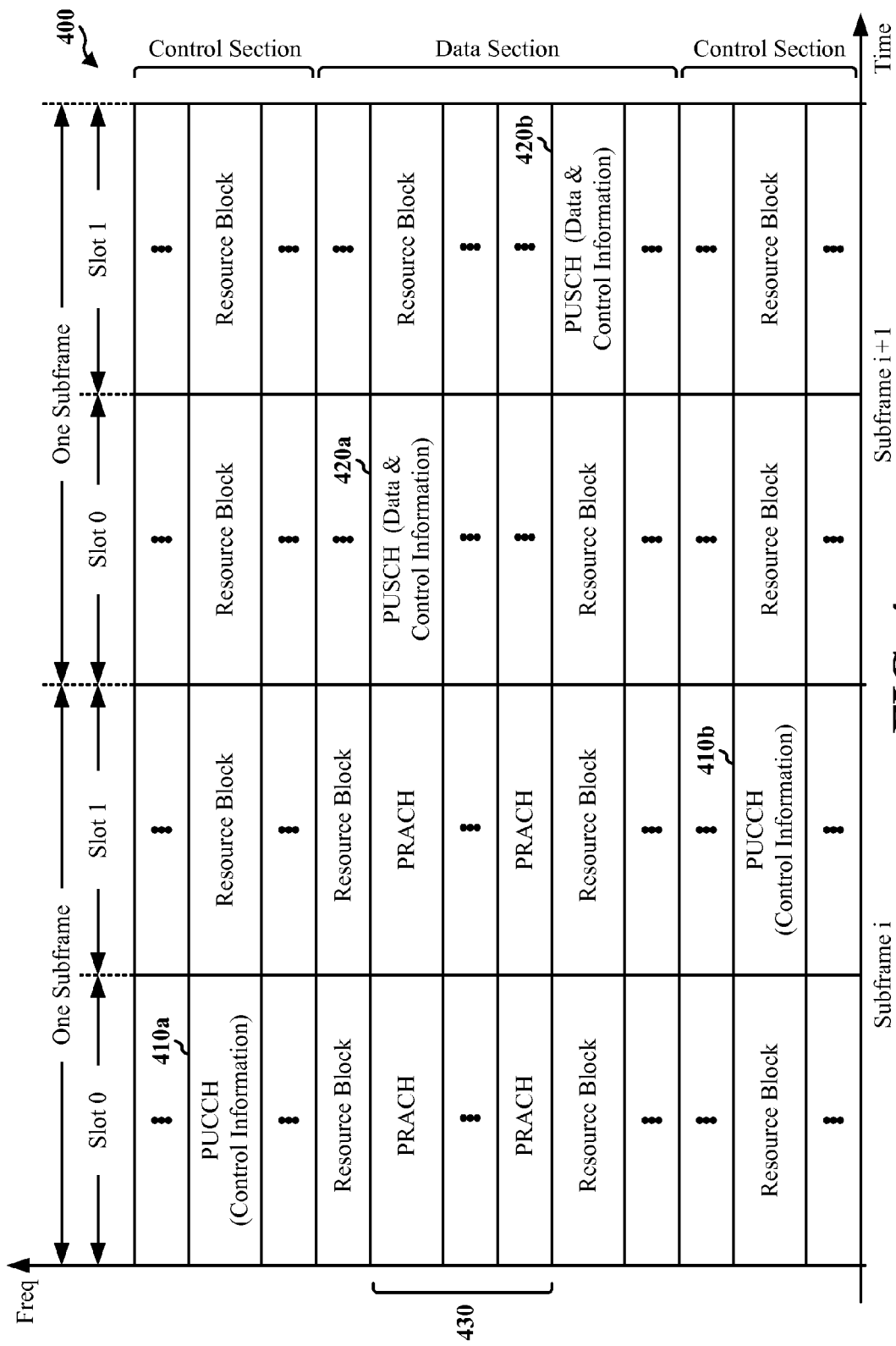
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
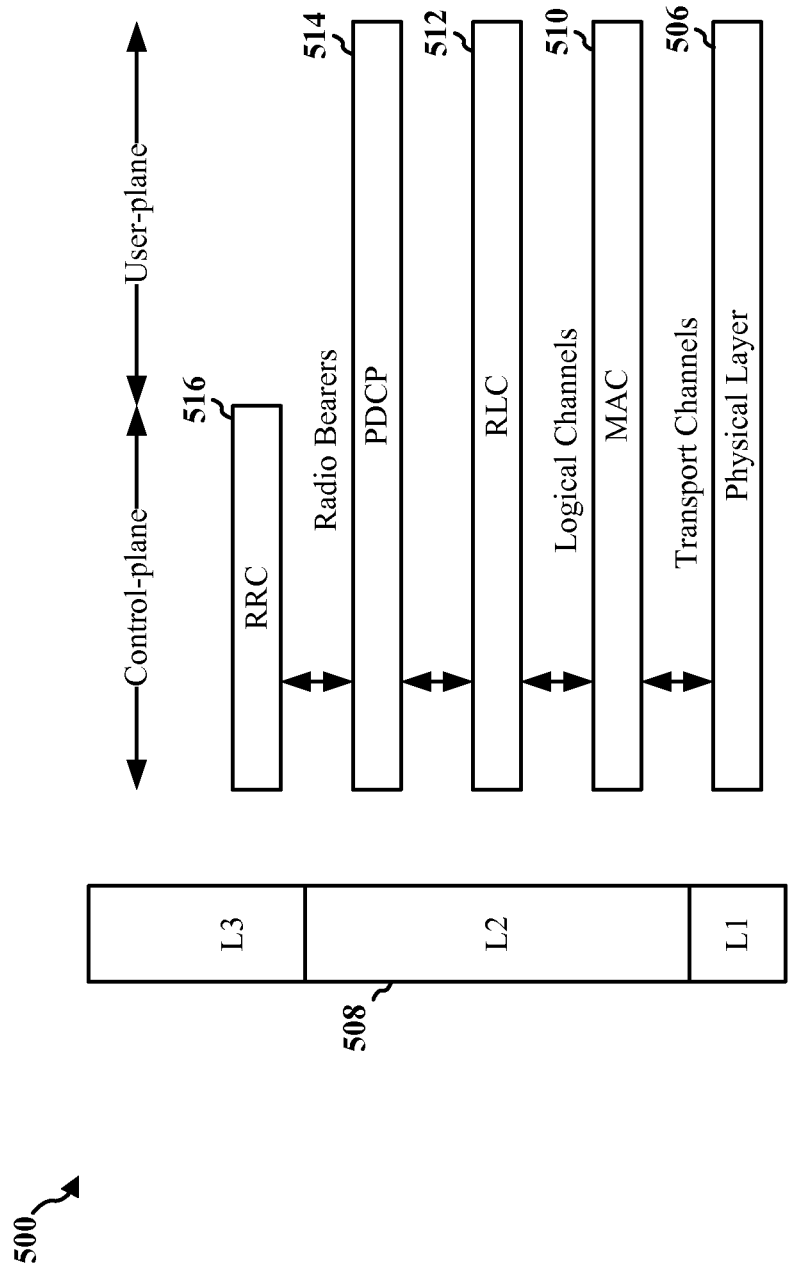
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
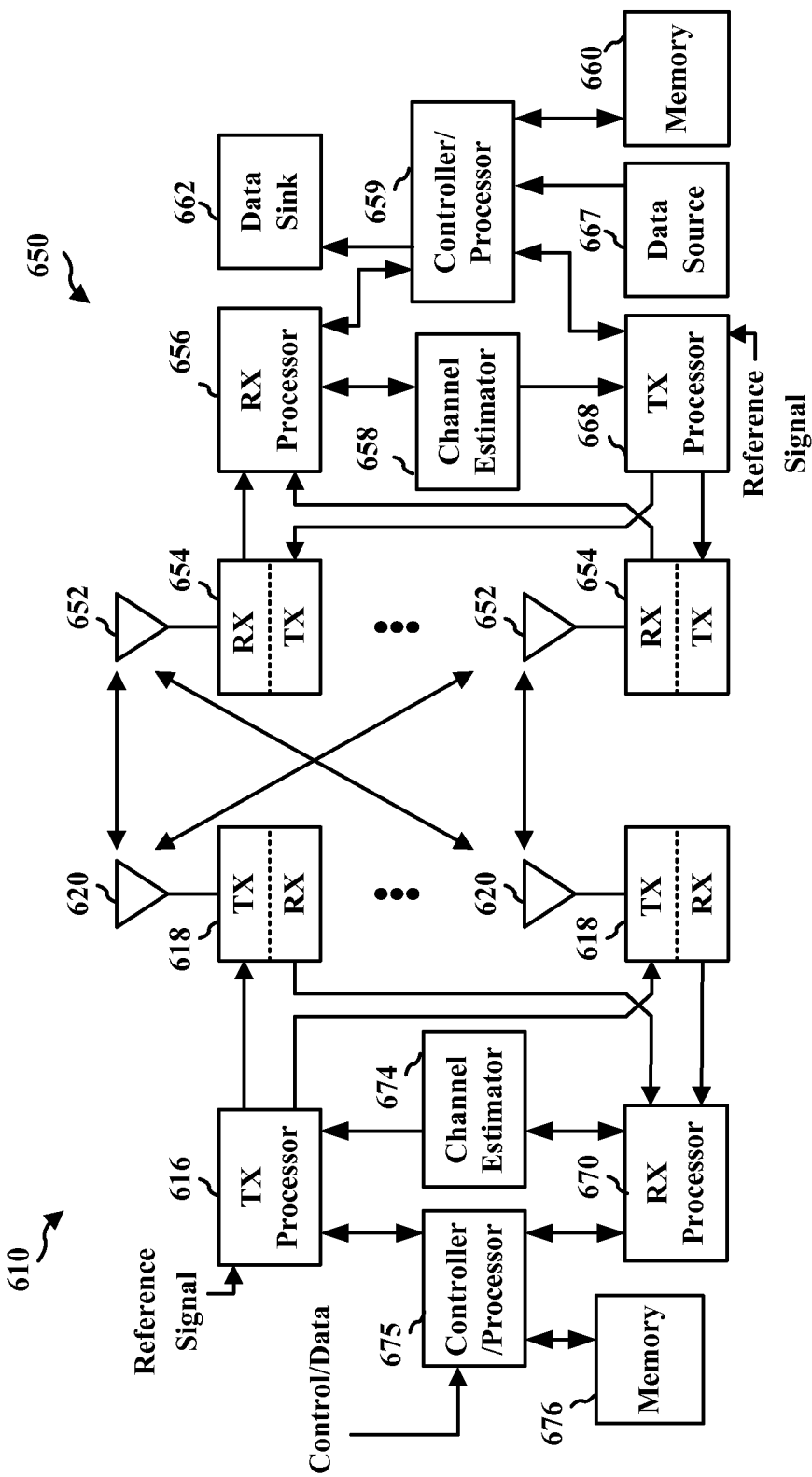
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
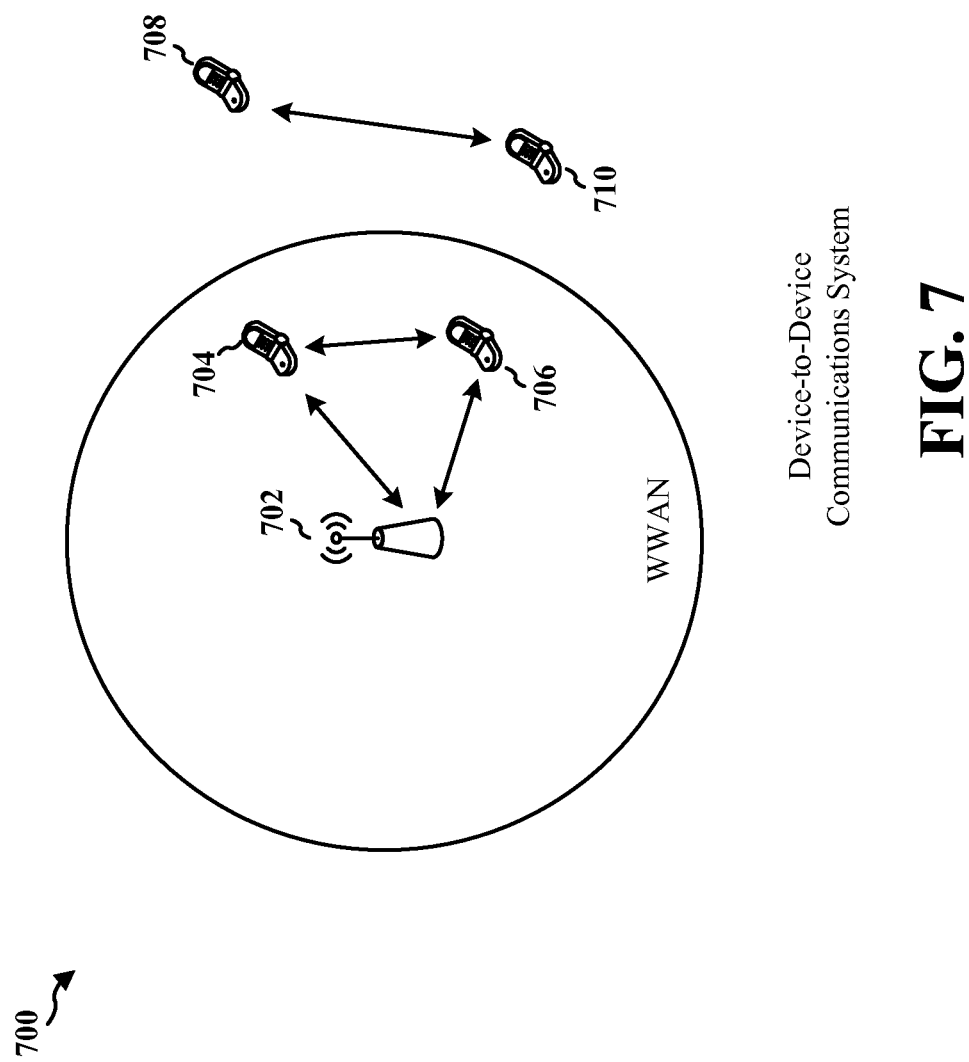
FIG. 7 is a diagram of a device-to-device communications system.

FIG. 7 is a diagram of a device-to-device communications system 700. The device-to-device communications system 700 includes a plurality of wireless devices 704, 706, 708, 710. The device-to-device communications system 700 may overlap with a cellular communications system, such as for example, a wireless wide area network (WWAN). Some of the wireless devices 704, 706, 708, 710 may communicate together in device-to-device (or peer-to-peer) communication using the DL/UL WWAN spectrum, some may communicate with the base station 702, and some may do both. For example, as shown in FIG. 7, the wireless devices 708, 710 are in device-to-device communication and the wireless devices 704, 706 are in device-to-device communication. The wireless devices 704, 706 are also communicating with the base station 702.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

In wireless networks, such as an LTE network, some UEs may know their location while other UEs may not. In one aspect, UEs that know their location may determine their location using global positioning system (GPS) technology. In another aspect, UEs may have a fixed location that is preconfigured. UEs that do not know their location may lack GPS or may be in an indoor environment. In some instances, UEs that do not know their location may position themselves using signals received from a base station. Positioning using base station signaling, however, may be inaccurate because the distance from the base station to the UE may be difficult to estimate accurately due to a lack of a direct path (e.g., non-line-of-sight). As such, the error in estimation may be significant (e.g., 50 meters or more).

In an aspect, a UE that does not know its location may determine its location from UEs that know their location using D2D positioning. D2D positioning through D2D signaling may be performed using techniques such as time of arrival (TOA) or time difference of arrival (TDOA). A UE may position itself using TOA/TDOA and the known positions of proximate UEs.

Several challenges exist for positioning in a wireless network. One challenge is bandwidth. In LTE, for example, the maximum bandwidth may be 20 MHz per carrier which may limit the accuracy of estimation TOA/TDOA. Estimation accuracy may be improved by receiving D2D signals from many devices and by choosing good measurements. Another challenge is the timing offset among UEs, which may be up to a few microseconds. The timing offset may cause significant inaccuracies in estimating the TOA or TDOA. Yet another challenge is power consumption. If UEs have to be RRC_CONNCTED to perform positioning, then positioning may be power and resource consuming. As such, a need exists for using D2D positioning to enable UEs to determine their location in either RRC_CONNECTED or RRC_IDLE mode. In addition to using D2D signaling for positioning, D2D signaling may be used for ranging (e.g., determining a distance between two wireless devices). As such, a need exists for a D2D signaling protocol for D2D ranging.

Figure 8:
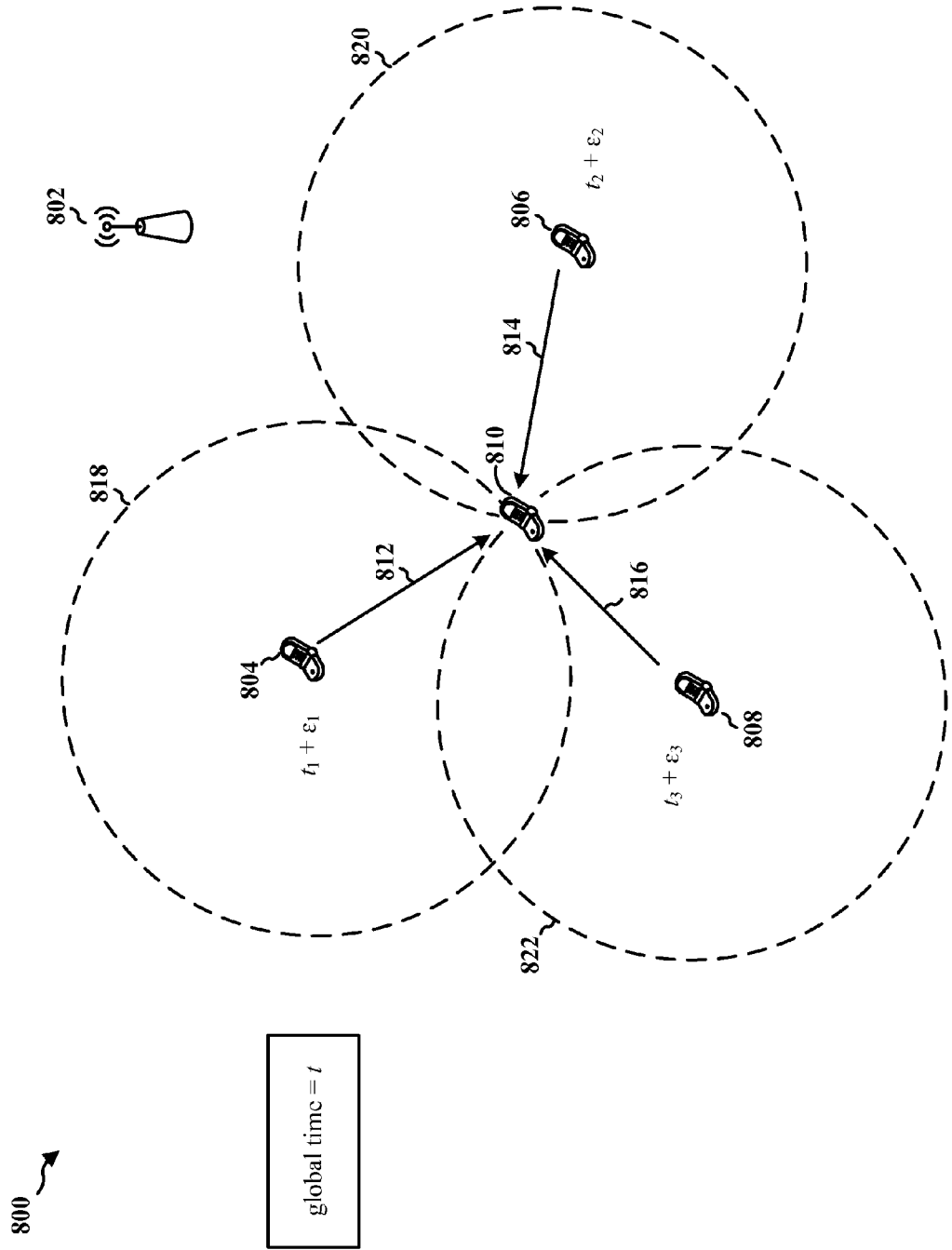
FIG. 8 illustrates a method for determining a device position using D2D positioning in a wireless network.

FIG. 8 illustrates a method for determining a device position using D2D positioning in a wireless network 800. Referring to FIG. 8, a base station 802 (e.g., an eNB) may be associated with a cell that includes UEs 804, 806, 808, 810. The cell may also include other UEs that are not pictured. The UEs 804, 806, 808 may be a group of UEs in which each of the UEs 804, 806, 808 knows its respective position/location. The UEs that are aware of their positions may be referred to as reference UEs or reference nodes. As such, the UEs 804, 806, 808 may be referred to as reference UEs. References UEs may transmit a D2D positioning message to help the UE 810 determine a position of the UE 810.

Referring to FIG. 8, each of the UEs 804, 806, 808 may transmit a respective positioning message 812, 814, 816 to the UE 810 (e.g., a D2D message). Each respective positioning message 812, 814, 816 may indicate a time at which the respective positioning message 812, 814, 816 is transmitted along with location information (e.g., x and y coordinates) of each of the respective UEs 804, 806, 808. In an ideal case, in which no synchronization offset exists between the UEs 804, 806, 808, 810, the UE 810 may determine a TOA for each of the three positioning messages 812, 814, 816 associated with the UE 804, 806, 808, respectively. Based on the difference between the TOA and the time at which the respective positioning messages 812, 814, 816 were sent, the UE 810 may determine the distance between each of the UEs 804, 806, 810 and the UE 810. For example, $\hat{d}_1$ may represent the measured distance (e.g., $\Delta t \ast c$) between the UE 804 and the UE 810, $\hat{d}_2$ may represent the measured distance between the UE 806 and the UE 810, and $\hat{d}_3$ may represent the measured distance between the UE 808 and the UE 810. In this example, $\Delta t$ represents the difference between a TOA and when a positioning message is sent and c represents the speed of light.

In one aspect, the UE 810 may determine its location using three circular regions 818, 820, 822. The three circular regions 818, 820, 822 may be based on the three measured distances $\hat{d}_1$, $\hat{d}_2$, $\hat{d}_3$ between the UEs 804, 806, 808 and the UE 810 and on the known sets of coordinates $(x_1, y_1)$, $(x_2, y_2)$, and $(x_3, y_3)$ which represent the position of each of the UEs 804, 806, 808, respectively. The known coordinates may represent the center of the circular region, and the distances may represent the radius of the circular region. The UE 810 may determine its position based on where the three circular regions 818, 820, 822 intersect.

In another aspect, the UE 804 may be associated with the known coordinates $(x_1, y_1)$, the UE 806 may be associated with the known coordinates $(x_2, y_2)$, the UE 808 may be associated with the known coordinates $(x_3, y_3)$, and the UE 810 may be associated with unknown coordinates $(x_4, y_4)$. Using the following equations, the UE 810 may determine its location by solving for $(x_4, y_4)$:

$$(x_4-x_1)^2+(y_4-y_1)^2=\hat{d}_1^2 \quad \text{(Eq. 1)}$$

$$(x_4-x_2)^2+(y_4-y_2)^2=\hat{d}_2^2 \quad \text{(Eq. 2)}$$

$$(x_4-x_3)^2+(y_4-y_3)^2=\hat{d}_3^2 \quad \text{(Eq. 3)}$$

These examples, however do not consider timing offsets between the UEs 804, 806, 808, 810. Small timing offsets between UEs may lead to significant inaccuracies. For example, a 100 ns timing offset between two reference UEs may result in a 30 meter positioning error (e.g., 100 ns*3× $10^8$ m/s). To illustrate the timing offset problem, referring to FIG. 8, assume a global clock may be denoted by t. The UE 804 may be configured to transmit the positioning message 812 at time $t_1$, the UE 806 may be configured to transmit the positioning message 814 at time $t_2$, and the UE 808 may be configured to transmit the positioning message 816 at time $t_3$. Each of the UEs 804, 806, 808 may have a timing error/offset from the global clock t, such that the UE 804 actually transmits at $t_1+\epsilon_1$, the UE 806 actually transmits at $t_2+\epsilon_2$, and the UE 808 actually transmits at $t_3+\epsilon_3$. Because the UE 810 may be unaware of each of the timing offsets $\epsilon_1$, $\epsilon_2$, $\epsilon_3$, the UE 810 may not accurately determine the measured distances $\hat{d}_1$, $\hat{d}_2$, $\hat{d}_3$ between the UEs 804, 806, 808 and the UE 810. As such, a protocol is needed that allows RRC_IDLE and RRC_CONNECTED UEs to determine their position using D2D positioning.

Figure 9A:
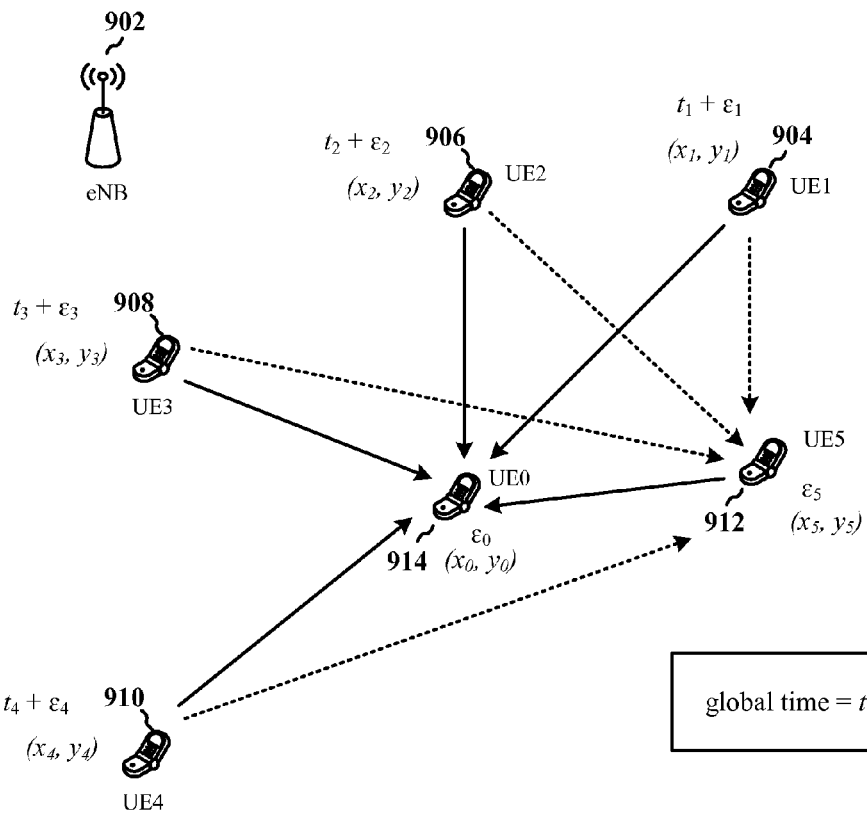
FIGS. 9A-B illustrate a first exemplary method for performing D2D positioning in a wireless network.
Figure 9B:
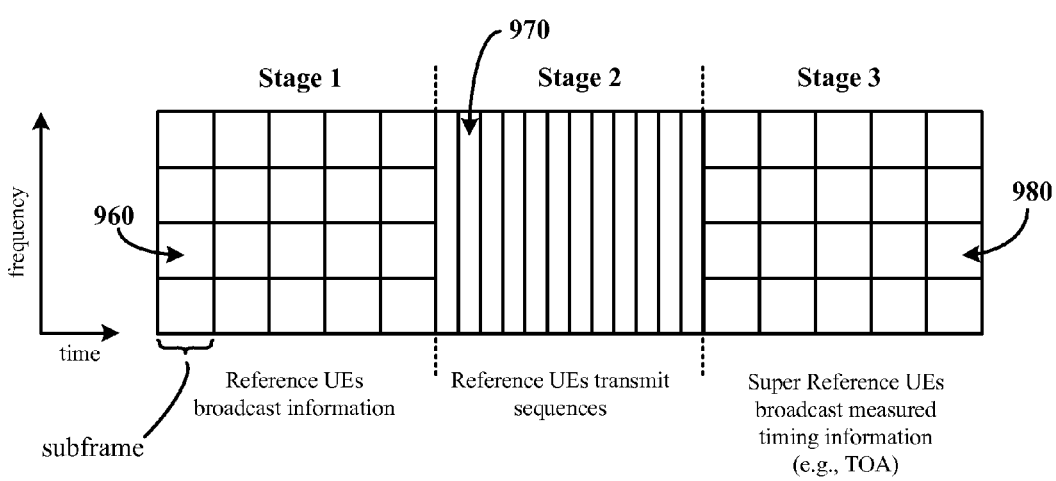

FIGS. 9A-B illustrate a first exemplary method for performing D2D positioning in a wireless network 900. Referring to FIG. 9A, a base station 902 (e.g., an eNB) may be associated with a cell that may include the UEs 904, 906, 908, 910, 912, 914. The cell may include other UEs that are not pictured. The UEs 904, 906, 908, 910, 912 may each know their respective position/location $(x_1, y_1)$, $(x_2, y_2)$, $(x_3, y_3)$, $(x_4, y_4)$, $(x_5, y_5)$, respectively, and the UE 914 may not know its location $(x_0, y_0)$. In FIG. 9A, the UEs 904, 906, 908, 910, 912 may be associated with a first set of UEs, which know their location (e.g., the set of UEs that know their location may be denoted by set A). The UE 914 and any other UEs that do not know their location may be associated with a second set of UEs (e.g., the set of UEs that do not know their location may be denoted by set B). Within the first set of UEs, the UEs 904, 906, 908, 910 may be a first reference UE type, and the UE 912 may be a second reference UE type (e.g., a super reference UE). UEs of the first reference UE type may broadcast sequences for positioning (e.g., a Zadoff Chu sequence). UEs of the second reference UE type may broadcast timing information, such as time of arrival or time difference of arrival, associated with broadcasted sequences from UEs of the first reference UE type. To determine the location/position of the UE 914, the UE 914 may utilize a distributed MAC protocol for positioning. The UE 914 may utilize a set of resources (e.g., a positioning phase) to determine a position associated with the UE 914.

FIG. 9B illustrates a set of resources 950 that may be used for D2D positioning. The set of resources 950 may include a number of consecutive subframes. In an aspect, the set of resources 950 may occur periodically (e.g., once every 5 seconds). If a UE (e.g., the UE 914) is RRC_IDLE, then the UE may sleep between adjacent periods of the sets of resources 950 to save power.

As shown in FIG. 9B, the set of resources 950 may include three subsets of resources: a first subset of the set of resources 950 corresponding to stage 1, a second subset of the set of resources 950 corresponding to stage 2, and a third subset of the set of resources 950 corresponding to stage 3. In an aspect, each column in the first and third subsets of resources may correspond to a subframe with corresponding subcarriers, and each block within the column may be associated with a subset of the subcarriers within the subframe. Each column in the second subset of resources may correspond to a symbol (e.g., an OFDM symbol) and may include all of the corresponding subcarriers associated with the symbol.

In an aspect, the base station 902 may transmit a message indicating the set of resources 950 to the UEs 904, 906, 908, 910, 912, 914. The message may indicate the first subset, the second subset, and/or the third subset of the set of resources 950. Each of the UEs 904, 906, 908, 910, 912, 914 may identify the set of resources 950 and each of the first subset, the second subset, and/or the third subset of the set of resources 950 based on the message received from the base station 902.

Referring to FIG. 9A, each UE of the first reference UE type may determine its position. For example, the UE 904 determines its position $(x_1, y_1)$, the UE 906 determines its position $(x_2, y_2)$, the UE 908 determines its position $(x_3, y_3)$, and the UE 910 determines its position $(x_4, y_4)$. In one aspect, the position of each respective UE may be determined based on GPS technology. In another aspect, each respective UE may be in a fixed location, and the position may be determined based on preconfigured settings/information. Similarly, each UE of the second reference UE type may determine its position. For example, the UE 912 may determine its position $(x_5, y_5)$. The UE 914, however, may not know its position $(x_0, y_0)$.

In the first subset of the set of resources 950, each UE of the first reference UE type may broadcast information in the first subset of the set of resources 950. For example, the UE 904 may broadcast information in the first subset of the set of resources. The information may include an identifier identifying the UE 904, a position of the UE 904, a sequence ID, and a resource ID. The sequence ID may identify a positioning sequence to be broadcasted in the second subset of the set of resources 950 (e.g., in stage 2). In an aspect, the sequence may be a Zadoff Chu sequence, and the sequence ID may correspond to the root index and cyclic shift of the Zadoff Chu sequence. Other sequences and corresponding forms of sequence IDs may also be used. The resource ID may identify at least one symbol in the second subset of the set of resources 950 in which the sequence may be transmitted by the UE 904. In an aspect, the resource ID may indicate a relative position of one or more symbols within a subframe. In an aspect, the UE 904 may determine the at least one symbol in the second subset of the set of resources 950 in which to broadcast the sequence. In one instance, the UE may determine the at least one symbol autonomously, such as by random selection or by energy-based detection. In energy-based detection, the UE 904 may detect the energy level of one or more symbols in the second subset of the set of resources 950 and select the at least one symbol with the lowest energy detected for broadcasting the sequence. In another instance, the UE 904 may receive a message from the base station 902 indicating which symbol(s) within the second subset of the set of resources 950 to select for broadcasting the sequence. In this aspect, the UE 904 may choose the symbol(s), or choose from among the symbol(s), indicated by the base station 902. In an aspect, the message in which the base station 902 indicates which symbol(s) to select within the second subset of the set of resources 950 may be the same message that indicates the first, second, and third subset of the set of resources 950 as discussed supra.

In one configuration, with respect to broadcasting the information in the first subset of the set of resources 950, the UE 904 may determine at least one resource, which may occupy one subframe and $m_1$ resource blocks (e.g., a resource 960 within a subframe), within the first subset of the set of resources 950 to broadcast the information. In an aspect, the UE 904 may determine the at least one resource autonomously, such as by random selection or by energy-based detection. In energy-based detection, the UE 904 may detect the energy level of one or more resources in the first subset of the set of resources 950 and select the at least one resource with the lowest energy detected for broadcasting the information. In another aspect, the UE 904 may receive a message from the base station 902 indicating which resource(s) within the first subset of the set of resources 950 to select for broadcasting the information. In this aspect, the UE 904 may choose the resource(s), or choose from among the resource(s), indicated by the base station 902. In an aspect, the message in which the base station 902 indicates which resource to select within the first subset of the set of resources 950 may be the same message that indicates the first, second, and third subset of the set of resources 950 as discussed supra. Further, in addition to the UE 904, other UEs of the first reference UE type, such as the UEs 906, 908, 910 may broadcast respective information (e.g., position, sequence ID, resource ID) associated which each of the UEs 906, 908, 910. In an aspect, the UEs 904, 906, 908, 910 may broadcast information in different resources within the first subset of the set of resources 950.

In the first subset of the set of resources 950 (e.g., stage 1), each UE of the second reference UE type (e.g., the UE 912) and second set of UEs unaware of their location (e.g., the UE 914) may listen for or receive a first set of information, which may include the information broadcasted (e.g., position, resource ID, sequence ID) by the UEs 904, 906, 908, 910 of the first reference UE type.

After broadcasting the information in the first subset of the set of resources 950, the UE 904 may broadcast the sequence associated with the sequence ID in at least one symbol (e.g., a resource 970, which may be an OFDM symbol) of the second subset of the set of resources 950. The sequence may be broadcasted in the resource ID indicated in the broadcasted information. In an aspect, the sequence may occupy an entire bandwidth (e.g., all of the subcarriers) of the at least one symbol. Similarly, the UEs 904, 906, 908, 910 may broadcast the respective sequence on the at least one symbol specified in the previously broadcasted information (e.g., the message indicating the resource ID). In another aspect, the UEs 904, 906, 908, 910 may broadcast the respective sequences in different symbols within the second subset of the set of resources 950. The sequence broadcasted may be a Zadoff Chu sequence (or another type of sequence) and may occupy at least one symbol time and the entire allocated bandwidth (e.g., 20 MHz, 40 MHz, etc.). Using a larger bandwidth to broadcast the sequence may improve accuracy. In an aspect, broadcasting the sequence on one symbol may allow for less resource overhead. As discussed in FIG. 8, however, each of the UEs may have a different timing offset. For example, assuming a global time t, the UEs 904, 906, 908, 910 may transmit the sequence at times $t_1, t_2, t_3, t_4$, respectively. Each of the UEs 904, 906, 908, 910 may have a timing offset $\epsilon_1, \epsilon_2, \epsilon_3, \epsilon_4$, respectively. As such, the actual times at which the UEs 904, 906, 908, 910 may transmit the sequence may be $t_1+\epsilon_1, t_2+\epsilon_2, t_3+\epsilon_3, t_4+\epsilon_4$, respectively. In an aspect, the UE 914 may have a timing offset $\epsilon_0$, and the UE 912 may have a timing offset $\epsilon_5$.

In the second subset of the set of resources 950 (e.g., stage 2), each UE of the second reference UE type (e.g., the UE 912) and second set of UEs unaware of their location (e.g., the UE 914) may listen for or receive a set of sequences (e.g., the broadcast sequences) from the UEs 904, 906, 908, 910 of the first reference UE type. In an aspect, each sequence in the set of sequences may be mutually orthogonal to each other (e.g., the UEs 904, 906, 908, 910 may select among 8 different root indices and offsets that may be associated with sequences that are mutually orthogonal). In this aspect, one symbol may have more than one sequence. Based on the broadcasted information and sequences, the UE 912 and the UE 914 may know the position (or location) of each of the UEs 904, 906, 908, 910 and be able to determine a respective time of arrival for the sequence received from each of the respective UEs 904, 906, 908, 910. The time of arrival may correspond to when each sequence was received.

In the third subset of the set of resources 950 (e.g., stage 3), each UE of the second reference UE type (e.g., the UE 912) may broadcast a second set of information. For example, the UE 912 may broadcast the second set of information. The second set of information may include the position or location of the UE 912. The second set of information may include identifiers identifying the UEs of the first reference UE type from which the UE 912 received sequences in the second subset of the set of resources 950. In one instance, the UE 912 may receive sequences from all of the UEs 904, 906, 908, 910, but in other instances, due to interference or distance, the UE 912 may only receive sequences from a subset of the UEs 904, 906, 908, 910. As such, the UEs 912, 914 may receive sequences from different UEs of the first reference UE type based on network conditions and distance from the UEs of the first reference UE type. The second set of information may include timing information, such as a time of arrival or a time difference of arrival, associated with the set of sequences received from UEs of the first reference UE type (e.g., the UEs 904, 906, 908, 910). In an aspect, the time difference of arrival represents the difference in time of arrivals between two sequences received from different UEs of the first reference UE type (e.g., the UE 904 and the UE 906). In another aspect, the set of sequences may have n sequences. The second set of information may include identifiers associated with UEs of the first reference UE type (e.g., the second set of information may include identifiers for the UEs 904, 906, 908, 910) for which a sequence was received by the UE 912.

In another aspect, the UE 912 (and other UEs of the second reference UE type) may receive a message from the base station 902 that indicates the third subset of the set of resources 950. The message may also indicate the first and second subsets of the set of resources 950. The UE 912 may determine at least one resource (e.g., a resource 980) for broadcasting the second set of information in the third subset of the set of resources 950 based on the message received from the base station 902. In an aspect, the UE 912 may determine the at least one resource autonomously, using a random selection or an energy-based detection. In another aspect, the UE 912 may determine the at least one resource based on an indication from the base station 902. For example, the base station 902 may indicate at least one resource in the third subset of the set of resources for transmitting the second set of information.

After stage 3, the UE 914 may have received the first set of information in the first subset of the set of resources 950 from the UEs 904, 906, 908, 910 indicating an identifier and a position of each of the UEs 904, 906, 908, 910, received sequences in the second subset of the set of resources 950 for D2D positioning from the UEs 904, 906, 908, 910, and received the second set of information from the UE 912. The second set of information may include the position of the UE 912, identifiers of the UEs (e.g., one or more of the UEs 904, 906, 908, 910) from which the UE 912 received sequences in the second subset of the set of resources 950, and timing information associated with the received sequences. Based on the aforementioned received first set of information, the received sequences, and the received second set of information, the UE 914 may determine its position based on the following equations:

$$\hat{d}_{10} = \left(\varepsilon_1 - \varepsilon_0 + \frac{d_{10}}{c}\right)c = d_{10} + (\varepsilon_1 - \varepsilon_0)c \quad \text{(Eq. 4)}$$

$$\hat{d}_{20} = \left(\varepsilon_2 - \varepsilon_0 + \frac{d_{20}}{c}\right)c = d_{20} + (\varepsilon_2 - \varepsilon_0)c \quad \text{(Eq. 5)}$$

$$\hat{d}_{30} = \left(\varepsilon_3 - \varepsilon_0 + \frac{d_{30}}{c}\right)c = d_{30} + (\varepsilon_3 - \varepsilon_0)c \quad \text{(Eq. 6)}$$

$$\hat{d}_{40} = \left(\varepsilon_4 - \varepsilon_0 + \frac{d_{40}}{c}\right)c = d_{40} + (\varepsilon_4 - \varepsilon_0)c \quad \text{(Eq. 7)}$$

$$\hat{d}_{15} = \left(\varepsilon_1 - \varepsilon_5 + \frac{d_{15}}{c}\right)c = d_{15} + (\varepsilon_1 - \varepsilon_5)c \quad \text{(Eq. 8)}$$

$$\hat{d}_{25} = \left(\varepsilon_2 - \varepsilon_5 + \frac{d_{25}}{c}\right)c = d_{25} + (\varepsilon_2 - \varepsilon_5)c \quad \text{(Eq. 9)}$$

$$\hat{d}_{35} = \left(\varepsilon_3 - \varepsilon_5 + \frac{d_{35}}{c}\right)c = d_{35} + (\varepsilon_3 - \varepsilon_5)c \quad \text{(Eq. 10)}$$

$$\hat{d}_{45} = \left(\varepsilon_4 - \varepsilon_5 + \frac{d_{45}}{c}\right)c = d_{45} + (\varepsilon_4 - \varepsilon_5)c \quad \text{(Eq. 11)}$$

Referring to the above equations, $\hat{d}_{10}$ corresponds to the measured distance (e.g., $\Delta t \ast c$) between the UE 904 and the UE 914, in which $\Delta t$ represents the difference between when the sequence was received from the UE 904 (e.g., TOA) and when the sequence was sent by the UE 904, and c represents the speed of light. The actual distance between the UE 904 and the UE 914 is represented by $d_{10}$, which is the actual distance between points $(x_1, y_1)$ and $(x_0, y_0)$ of which only $(x_1, y_1)$ is known by the UE 914. As such, the measured distance $\hat{d}_{10}$ is based on the actual distance $d_{10}$ plus any distance $(\varepsilon_1-\varepsilon_0)c$ resulting from the timing offset between the UEs 904, 914. Similarly, $\hat{d}_{20}$ corresponds to the measured distance between the UE 906 and the UE 914, $d_{20}$ represents the actual distance between the UE 906 and the UE 914, $\hat{d}_{30}$ corresponds to the measured distance between the UE 908 and the UE 914, $d_{30}$ represents the actual distance between the UE 908 and the UE 914, $\hat{d}_{40}$ corresponds to the measured distance between the UE 910 and the UE 914, $d_{40}$ represents the actual distance between the UE 910 and the UE 914, $\hat{d}_{15}$ corresponds to the measured distance between the UE 904 and the UE 912, $d_{15}$ represents the actual distance between the UE 904 and the UE 912, $\hat{d}_{25}$ corresponds to the measured distance between the UE 906 and the UE 912, $d_{25}$ represents the actual distance between the UE 906 and the UE 912, $\hat{d}_{35}$ corresponds to the measured distance between the UE 908 and the UE 912, $d_{35}$ represents the actual distance between the UE 908 and the UE 912, $\hat{d}_{45}$ corresponds to the measured distance between the UE 910 and the UE 912, and $d_{45}$ represents the actual distance between the UE 910 and the UE 912. In an aspect, the UE may determine $\hat{d}_{15}$, $\hat{d}_{25}$, $\hat{d}_{35}$, and $\hat{d}_{45}$ based on the received timing information (e.g., TOA) from the UE 912. For example, $\hat{d}_{15}=\Delta t \ast c$, where $\Delta t$ is the difference between the TOA of the sequence and when the sequence is sent. The UE 914 may know when the sequences are sent because the UE 914 may receive the same sequences from the UEs 904, 906, 908, 910 on the symbols identified by the resource IDs broadcast by UEs 904, 906, 908, 910 in the first subset of the set of resources 950. Alternatively, the UE 914 may know when the sequences are sent because the UE 912 may provide information on when each respective sequence is sent by the UEs 904, 906, 908, 910 in the second set of information. In another aspect, the UE 912 may send Δt to the UE 914. Subsequently, the UE 914 may take the difference of the above equations to obtain the following equations:

$$\hat{d}_{10} - \hat{d}_{20} = d_{10} - d_{20} + (\epsilon_1 - \epsilon_2)c \quad \text{(Eq. 12)}$$

$$\hat{d}_{20} - \hat{d}_{30} = d_{20} - d_{30} + (\epsilon_2 - \epsilon_3)c \quad \text{(Eq. 13)}$$

$$\hat{d}_{30} - \hat{d}_{40} = d_{30} - d_{40} + (\epsilon_3 - \epsilon_4)c \quad \text{(Eq. 14)}$$

$$\hat{d}_{15} - \hat{d}_{25} = d_{15} - d_{25} + (\epsilon_1 - \epsilon_2)c \quad \text{(Eq. 15)}$$

$$\hat{d}_{25} - \hat{d}_{35} = d_{25} - d_{35} + (\epsilon_2 - \epsilon_3)c \quad \text{(Eq. 16)}$$

$$\hat{d}_{35} - \hat{d}_{45} = d_{35} - d_{45} + (\epsilon_3 - \epsilon_4)c \quad \text{(Eq. 17)}$$

As shown above, by taking the difference, the timing offset $\epsilon_0$ was canceled out. Alternatively, the Eqs. 12-17, and more specifically the values for $\hat{d}_{15} - \hat{d}_{25}$, $\hat{d}_{25} - \hat{d}_{35}$, and $\hat{d}_{35} - \hat{d}_{45}$, may be determined by the UE 914 if the UE 912 provides the TDOA of the sequences received by the UE 912 from the UEs 904, 906, 908, 910. In this alternative, the UE 914 may know when the sequences were sent because the same sequences were received by the UE 914. In another aspect, the UE 914 may know when the sequences were sent because the UE 912 may indicate when the sequences were sent in the second set of information.

After obtaining Eqs. 12-17, the UE 914 may take another difference of the Eqs. 12-17 (e.g., so called taking a double difference), to obtain the following equations:

$$(\hat{d}_{10} - \hat{d}_{20}) - (\hat{d}_{15} - \hat{d}_{25}) = (d_{10} - d_{20}) - (d_{15} - d_{25}) \quad \text{(Eq. 18)}$$

$$(\hat{d}_{20} - \hat{d}_{30}) - (\hat{d}_{25} - \hat{d}_{35}) = (d_{20} - d_{30}) - (d_{25} - d_{35}) \quad \text{(Eq. 19)}$$

$$(\hat{d}_{30} - \hat{d}_{40}) - (\hat{d}_{35} - \hat{d}_{45}) = (d_{30} - d_{40}) - (d_{35} - d_{45}) \quad \text{(Eq. 20)}$$

In Eqs. 18-20, the remaining timing offsets $\epsilon_1, \epsilon_2, \epsilon_3, \epsilon_4$ also canceled out. Using Eqs. 18-20, the UE 914 may solve for the two unknown variables $x_0$ and $y_0$ corresponding to the position of the UE 914. In an aspect, the UE 914 may determine its position using the aforementioned D2D signaling and protocol in either RRC_CONNCTED or RRC_IDLE mode.

Figure 10A:
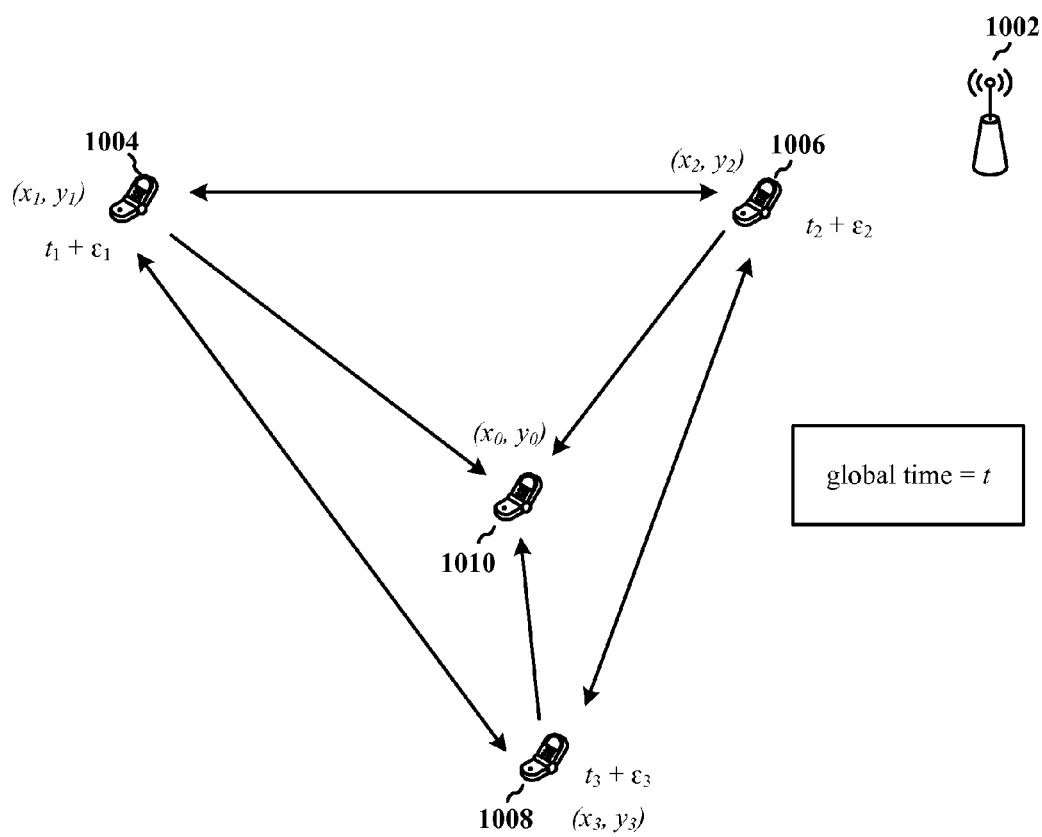
FIGS. 10A-B illustrate a second exemplary method for enabling synchronization between devices for performing D2D positioning in a wireless network.
Figure 10B:
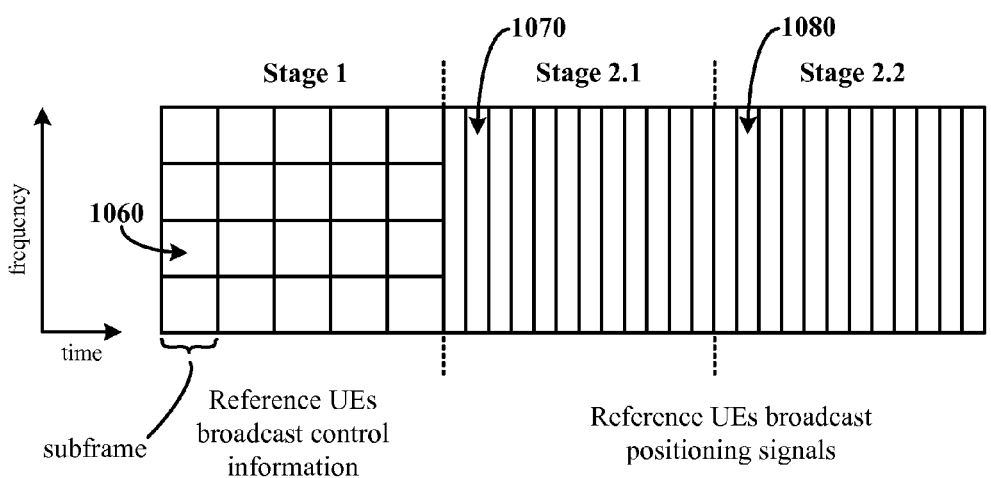

FIGS. 10A-B illustrate a second exemplary method for enabling synchronization between devices for performing D2D positioning in a wireless network 1000. Referring to FIG. 10A, a base station 1002 (e.g., an eNB) may be associated with a cell that includes UEs 1004, 1006, 1008, 1010. The cell may also include other UEs that are not pictured. The UEs 1004, 1006, 1008 may be a group of reference UEs, in which each of the UEs 1004, 1006, 1008 knows its respective position. The UEs 1004, 1006, 1008 may enable the UE 1010 to determine its position/location based on D2D signaling.

To resolve the issue of synchronization between reference UEs for D2D positioning as previously discussed with respect to FIG. 8, the UEs 1004, 1006, 1008 may first attempt to become synchronized. The synchronization process may occur in multiple stages.

FIG. 10B illustrates a set of resources 1050. Stage 1 represents a first subset of the set of resources, stage 2.1 represents a second subset of the set of resources, and stage 2.2 represents a third subset of the set of resources. In stage 1, multiple subframes are depicted (e.g., each column may represent a subframe with corresponding subcarriers). In stages 2.1 and 2.2, each column may represent a symbol and all of the corresponding subcarriers associated with the symbol (e.g., an OFDM symbol). In stage 1, each reference UE, including the UE 1004, may select one or more subframes (e.g., a resource 1060) to transmit a message, and the message may include information about the position of the reference UE and a resource identifier (ID). The resource ID may identify one or more resources (e.g., a first symbol 1070) on which the reference UE (e.g., the UE 1004) may transmit a signal (e.g., positioning sequence, such as a Zadoff Chu sequence). In an aspect, the resource ID may indicate a relative position of one or more resources within a subframe. Each reference UE, including the UE 1004, may transmit m≥1 signals during stage 2. For example, if m=2, the reference UE, such as the UE 1004, may transmit a sequence during stage 2.1 (e.g., in the first symbol 1070) and another sequence during stage 2.2 (e.g., in a second symbol 1080). In this example, the resource ID may identify at least one symbol in stage 2.1 (e.g., the second subset of the set of resources) and in stage 2.2 (e.g., the third subset of the set of resources) at which the UE 1004 will transmit a sequence. If m=3, the reference UE may transmit a sequence during stages 2.1, 2.2, and 2.3. In this example, the resource ID may identify at least one symbol in stages 2.1, 2.2, and 2.3, which may correspond to the second, third and fourth subsets of the set of resources. If m=n, the reference UE may transmit a sequence during stages 2.1, . . . 2.n.

In an aspect, the reference UEs may determine the set of resources 1050 on which to transmit the messages based on a resource message received from the base station 1002 (the resource message may be received before the reference UEs transmit in the set of resources 1050). That is, the base station 1002 may transmit/broadcast the resource message to UEs that indicates the set of resources 1050 for D2D positioning. The resource message from the base station 1002 may indicate the first subset of the set of resources (e.g., stage 1), the second subset of the set of resources (e.g., stage 2.1), the third subset of the set of resources (e.g., stage 2.2), and any other number of subsets of the set of resources. In an aspect, the resource message may indicate a type of sequence to use for D2D positioning (e.g., a type of Zadoff Chu sequence).

Upon determining the set of resources 1050, the reference UEs may determine at least one resource (e.g., a subframe) for transmitting the message in stage 1. In one aspect, the at least one resource may be indicated by the resource message received from the base station 1002 or in another message received from the base station 1002. In another aspect, the reference UEs may determine the at least one resource autonomously (e.g., based on random selection or on energy-based detection (select the resource with the lowest energy)).

Similarly, the reference UEs may determine at least one symbol of the second subset of the set of resources for transmitting the sequence in stage 2.1 (or of any subset of the set of resources for transmitting the sequence). In one aspect, the at least one symbol may be indicated by the resource message received from the base station 1002 or in another message received from the base station 1002. In another aspect, the reference UEs may determine the at least one symbol autonomously (e.g., based on random selection or on energy-based detection (select the symbol with the lowest energy)).

Referring to FIGS. 10A and 10B, each UE 1004, 1006, 1008, 1010 may listen in stage 1 and stage 2.1, subject to the half duplex constraint, for messages and sequences from reference UEs. For example, the UE 1004 may receive messages transmitted in stage 1 from the UEs 1006, 1008. The UE 1006 may receive messages transmitted in stage 1 from the UEs 1004, 1008. The UE 1008 may receive messages transmitted in stage 1 from the UEs 1004, 1006. Based on these received messages, the UEs 1004, 1006, 1008 may listen in stage 2.1 and/or stage 2.2 for sequences transmitted by the other reference UEs. Although this example has 3 reference UEs, different numbers of reference UEs may be utilized for D2D positioning.

After each reference UE receives the sequences transmitted by other reference UEs, each reference UE may calculate the actual propagation delay based on its own location and the location of the other reference UEs (e.g., known from the messages in stage 1). Using the actual propagation delay and the time of arrival of the received sequence, each reference UE may estimate the time difference between itself and another reference UE. The estimated time difference may be used to adjust the timing of the sequence transmission in a subsequent stage (e.g., sequences received in stage 2.1 may be used to adjust the timing of transmissions in stage 2.2).

This process may be explained by an example. Assume a global clock t as in FIG. 8. Each of the reference UEs (e.g., the UEs 1004, 1006, 1008) may be synchronized to the global clock t with some timing error/offset. The UE 1004 may be configured to transmit a sequence at time $t_1$, the UE 1006 may be configured to transmit a sequence at time $t_2$, and the UE 1008 may be configured to transmit a sequence at time $t_3$. Each of the UEs 1004, 1006, 1008 may have a timing error/offsets from the global clock t, such that the UE 1004 actually transmits at $t_1+\epsilon_1$, the UE 1006 actually transmits at $t_2+\epsilon_2$, and the UE 1008 actually transmits at $t_3+\epsilon_3$, where $\epsilon_1$, $\epsilon_2$, $\epsilon_3$, correspond to the timing offsets of the UEs 1004, 1006, 1008, respectively.

Referring to FIG. 10A, the UE 1006 may receive sequences from the UE 1004 and the UE 1008. Assuming the UE 1004 transmits the sequence at time $t_1+\epsilon_1$, the UE 1006 may receive the sequence and determine a propagation delay between the UEs 1004, 1006 and a time of arrival of the sequence based on when the sequence was received. The propagation delay may be determined by $d_1/c$, where $d_1$ is the actual distance between the UEs 1004, 1006 and c is the speed of light. The UE 1006 may determine $d_1$ because the UE 1006 knows its location and knows the location of the UE 1004 based on the message received from the UE 1004 in stage 1. The difference between the propagation delay and the difference between TOA and time sent represents the time difference, $\epsilon_2-\epsilon_1$, between the UEs 1006, 1004. In a similar fashion, the UE 1006 may determine the time difference, $\epsilon_2-\epsilon_3$, between the UEs 1006, 1008. The UE 1006 may determine an average time difference, $\epsilon_{avg,2}$, between the UE 1006 and all reference UEs, using Eq. 21:

$$\epsilon_{avg,2} = \frac{\sum_{j=1}^{n}(\epsilon_2 - \epsilon_j)}{n} \qquad \text{(Eq. 21)}$$

where n may correspond to the total number of reference UEs.

By determining an average time difference between the UE 1006 and other the reference UEs, the UE 1006 may adjust the transmission timing for the sequence in order to become more synchronized with the other reference UEs. The other references UEs (e.g., the UE 1004, 1008) may determine similar average time differences $\epsilon_{avg,1}$, $\epsilon_{avg,3}$. The UEs 1004, 1006, 1008 may each adjust their respective clocks (e.g., $t_1+\epsilon_1-\epsilon_{avg,1}$) based on the respective average time differences $\epsilon_{avg,1}$, $\epsilon_{avg,2}$, $\epsilon_{avg,3}$, to approach a synchronized time difference $\epsilon$ among all of the reference UEs. Depending on the number of sequences to be transmitted by the reference UEs, each reference UE may readjust the transmission timing to become more synchronized based on received sequences that have been time adjusted. For example, if m=2, then each reference UE may use the first sequence from other reference UEs to adjust the transmission timing and transmit a second sequence that enables the UE 1010 to determine the position of the UE 1010. If m=3, then each reference UE may use the first two sequences from other reference UEs to adjust and readjust the transmission timing and transmit a third sequence that enables the UE 1010 to determine the position of the UE 1010. If m=n, then each reference UE may use n-1 sequences from other reference UEs to adjust and readjust the transmission timing and transmit an nth sequence that enables the UE 1010 to determine the position of the UE 1010.

Referring to FIGS. 10A-B, assuming m=2, at stage 2.2, the UE 1010 may receive sequences from the UEs 1004, 1006, 1008 based on the synchronized timing offset, $\epsilon$. For example, due to synchronization, the UE 1004 may transmit the sequence at time $t_1+\epsilon$, the UE 1006 may transmit the sequence at time $t_2+\epsilon$, and the UE 1008 may transmit the sequence at time $t_3+\epsilon$. Assuming the UE 1010 has a timing offset of $\epsilon_0$, the UE 1010 may determine its position based on the following equations:

$$\hat{d}_1 = \left(\epsilon - \epsilon_0 + \frac{d_1}{c}\right)c = d_1 + (\epsilon - \epsilon_0)c \qquad \text{(Eq. 22)}$$

$$\hat{d}_2 = \left(\epsilon - \epsilon_0 + \frac{d_2}{c}\right)c = d_2 + (\epsilon - \epsilon_0)c \qquad \text{(Eq. 23)}$$

$$\hat{d}_3 = \left(\epsilon - \epsilon_0 + \frac{d_3}{c}\right)c = d_3 + (\epsilon - \epsilon_0)c \qquad \text{(Eq. 24)}$$

where $\hat{d}_1$, $\hat{d}_2$, $\hat{d}_3$ are the respective measured distances between UE 1004 and UE 1010, UE 1006 and UE 1010, and UE 1008 and UE 1010. The UE 1010 may calculate the respective values $\hat{d}_1$, $\hat{d}_2$, $\hat{d}_3$ by determining the difference between the time each respective sequence was sent and received (e.g., time of arrival) and by multiplying the difference by c.

Based on Eqs. 22-24, the UE 1010 may solve for its position $(x_0, y_0)$ by taking the difference between Eqs. 22 and 23 and by taking the difference between Eqs. 23 and 24. Because the timing difference terms are the same, the timing difference terms drop out to create Eqs. 25 and 26:

$$\hat{d}_1 - \hat{d}_2 = d_1 - d_2 \qquad \text{(Eq. 25)}$$

$$\hat{d}_2 - \hat{d}_3 = d_2 - d_3 \qquad \text{(Eq. 26)}$$

where $d_1$ is the distance between $(x_1, y_1)$ and $(x_0, y_0)$, $d_2$ is the distance between $(x_2, y_2)$ and $(x_0, y_0)$, and $d_3$ is the distance between $(x_3, y_3)$ and $(x_0, y_0)$. Because the values for $(x_1, y_1)$, $(x_2, y_2)$, and $(x_3, y_3)$ are all known, the UE 1010 may solve for $(x_0, y_0)$ to determine the location of the UE 1010. As such, in this example, the UE 1010 and other UEs with unknown locations may use the sequence in stage 2.2 to estimate location. In an aspect, the UE 1010 may determine its position using D2D signaling whether in RRC_CONNECTED mode or RRC_IDLE mode.

Although the aforementioned example with respect to FIG. 10B includes stages 1, 2.1, and 2.2, the reference UEs may determine to use additional stages (e.g., stages 1, 2.1, 2.2, and 2.3). As such, in stage 2.1 and 2.2, the reference UEs may adjust and readjust the transmission timing accordingly based on sequences received from other reference UEs.

Figure 11:
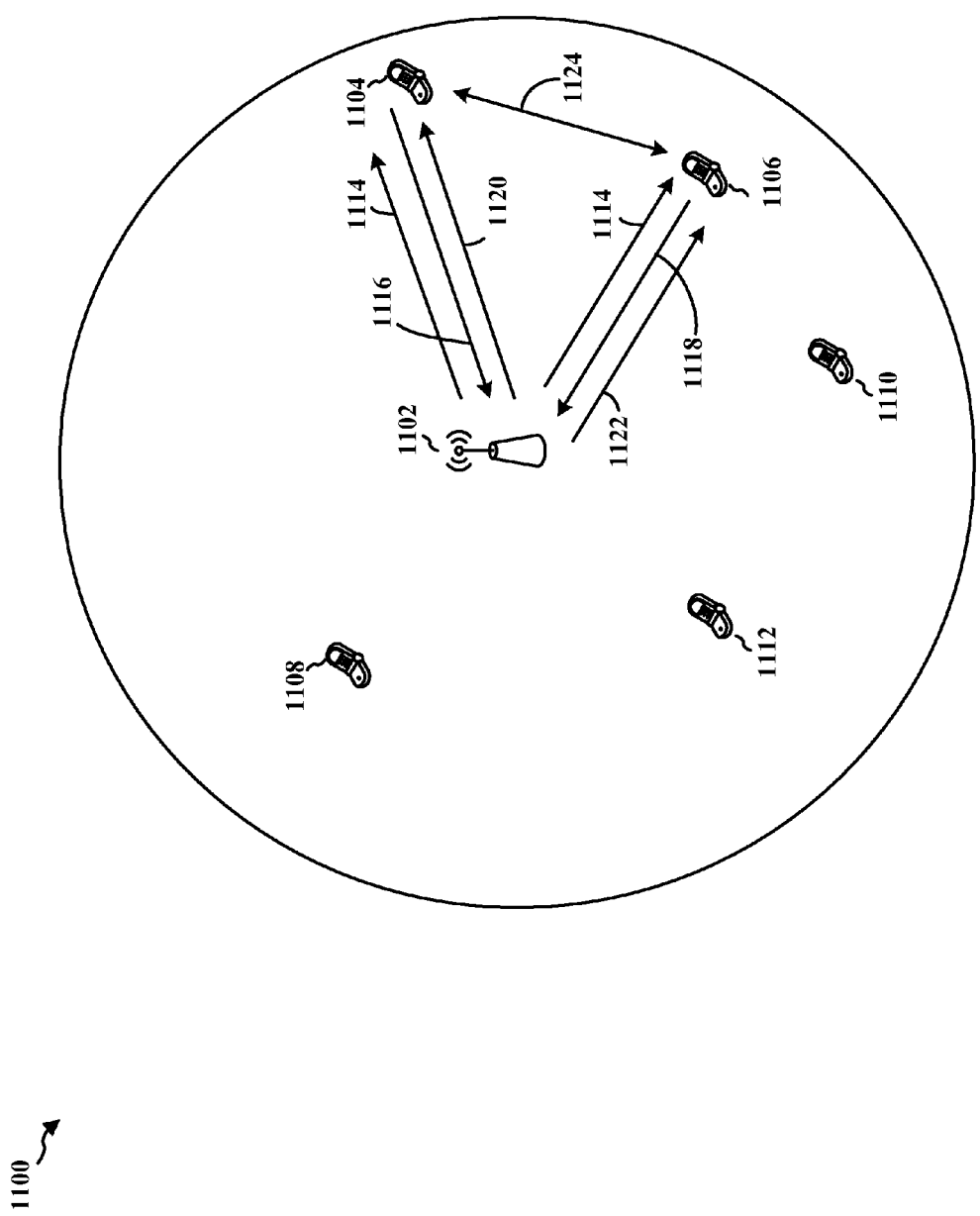
FIG. 11 illustrates an exemplary method of obtaining authorization to participate in D2D positioning and/or in D2D ranging in a wireless network.

FIG. 11 illustrates an exemplary method of obtaining authorization to participate in D2D positioning and/or in D2D ranging in a wireless network 1100. Referring to FIG. 11, a base station 1102 (e.g., an eNB) may be operating in a cell that includes UEs 1104, 1106, 1108, 1110, 1112. In an aspect, a different number of UEs may be within the cell served by the base station 1102. The UE 1106 may not know its position, whereas the UEs 1104, 1108, 1110, 1112 may know each of their own respective positions. The UEs 1104, 1106, 1108, 1110, 1112 may want to participate in D2D positioning (e.g., using one of the methods described in FIG. 9A-B or 10A-B) and/or in D2D ranging. UEs that want to participate in D2D positioning and/or ranging as described above may need to obtain authorization from the base station 1102.

To enabling D2D positioning and/or ranging, the base station 1102 may transmit a resource message 1114 that indicates a first set of resources (e.g., the set of resource 950 or the set of resources 1050) that may be used for D2D positioning and/or a second set of resources that may be used for D2D ranging. The first and second sets of resources may occur periodically. In an aspect, the first set of resources may be dedicated for D2D positioning and/or the second set or resources may be dedicated for D2D ranging. In another aspect, a subset of the first set of resources (e.g., stage 1 in FIG. 9B or 10B) may be used for transmitting location/position information associated with one or more UEs. Another subset of the first set of resources (e.g., stage 2 in FIG. 9B or stages 2.1 and 2.2 in FIG. 10B) may be used for transmitting Zadoff Chu sequences. In an aspect, the base station 1102 may transmit the resource message 1114 using either dedicated RRC signaling (e.g., unicast) or a broadcast mechanism (e.g., a SIB). In another aspect, the base station 1102 may use separate messages, instead of the same message, to signal resources for D2D positioning and D2D ranging.

The UEs 1104, 1106, while in an RRC_CONNECTED mode, may signal the base station 1102 to ask for permission to participate in D2D positioning and/or D2D ranging while in RRC_IDLE mode, in RRC_CONNECTED mode, or both. For example, the UE 1104 may transmit a first message 1116 to the base station 1102. The first message 1116 may include a first request to participate in D2D positioning within the first set of resources and/or a second request to participate in D2D ranging with the UE 1106 within the second set of resources. In an aspect, the second request to participate in D2D ranging with the UE 1106 may include a UE identifier identifying the UE 1106. Similarly, the UE 1106 may transmit a second message 1118 to the base station 1102. The second message 1118 may include a third request to participate in D2D positioning within the first set of resources and/or a fourth request to participate in D2D ranging with the UE 1104 within the second set of resources. In an aspect, the UEs 1104, 1106 may indicate in the respective first and second messages 1116, 1118 a mode in which the UEs 1104, 1106 want to participate in D2D positioning/ranging. For example, the UE 1104 may want to participate in D2D positioning while in RRC_IDLE mode and/or in RRC_CONNECTED mode, and the UE 1104 may want to participate in D2D ranging while in RRC_IDLE mode and/or in RRC_CONNECTED mode. As such, in the first message 1116, the UE 1104 may indicate a mode request for participating D2D positioning and/or D2D ranging. Similarly, in the second message 1118, the UE 1106 may indicate a mode request for participating D2D positioning and/or D2D ranging.

Upon receiving the first message 1116 and/or the second message 1118, the base station 1102 may determine whether to allow the UEs 1104, 1106 to participate in D2D positioning and/or D2D ranging. In an aspect, the base station 1102 may allow a limited number of UEs to participate in D2D positioning and/or D2D ranging based on the first and second sets of resources, respectively, to avoid causing excessive interference in the first and second sets of resources. As such, when the number of UEs requesting to participate in D2D positioning/ranging exceeds a threshold (e.g., 10 UEs), the base station 1102 may deny any further requests. In another aspect, the base station 1102 may not limit the number of UEs participating in D2D ranging/positioning.

In one aspect, the base station 1102 may determine in what mode to allow the UEs 1104, 1106 to perform D2D ranging/positioning. The base station 1102 may determine whether to allow the UE 1104 to participate in D2D positioning and/or D2D ranging while the UE 1104 is in RRC_IDLE mode, RRC_CONNECTED mode, or both. Similarly, the base station 1102 may determine whether to allow the UE 1106 to participate in D2D positioning and/or D2D ranging while the UE 1106 is in RRC_IDLE mode, RRC_CONNECTED mode, or both.

In another aspect, if the base station 1102 determines to allow the UEs 1104, 1106 to participate in D2D positioning, the base station 1102 may determine whether the UEs 1104, 1106 are allowed only listen to positioning signals/sequences or whether the UEs 1104, 1106 may also transmit positioning signals/sequences. For example, because the UE 1104 knows its location, the base station 1102 may determine that the UE 1104 is allowed to listen to and transmit positioning signals. By contrast, because the UE 1106 does not know its location, the base station 1102 may determine that the UE 1106 is allowed only listen to positioning signals. In an aspect, the first and/or second messages 1116, 1118 may indicate whether the UE 1104 or the UE 1106, respectively, knows its location/position.

In another aspect, if the base station 1102 determines, for example, that the UE 1104 is allowed to participate in D2D positioning and to transmit positioning signals, the base station 1102 may determine a subset of the first set of resources for the UE 1104 to perform D2D positioning. In one example, the base station 1102 may indicate the resource 960 for broadcasting position information and indicate the resource 970 for broadcasting positioning sequences. The base station 1102 may indicate the resource 970 using a resource ID. In another example, the base station 1102 may indicate the resource 980 for broadcasting position information and timing information. In another example, the base station 1102 may indicate the resource 1060 for broadcasting position information and the first and second symbols 1070, 1080 (e.g., using a resource ID) for broadcasting positioning sequences. In another aspect, the base station 1102 may indicate a type of positioning sequence to be broadcasted (e.g., indicate a Zadoff Chu sequence by indicating a root index and a cyclic shift) for D2D positioning and/or for D2D ranging.

In another aspect, if the base station 1102 determines, for example, that the UE 1104 is allowed to participate in D2D ranging, then the base station 1102 may determine a subset of the second set of resources for initiating D2D ranging (e.g., a subset of time-frequency resources).

Similarly determinations by the base station 1102 may be performed with respect to the UE 1106. Assuming the base station 1102 determines to allow the UE 1106 to participate in D2D positioning and D2D ranging, the base station 1102 may determine in what mode to allow the UE 1106 to perform D2D ranging/positioning. Further, the base station 1102 may determine whether to allow the UE 1106 to listen to and to transmit positioning sequences, or only to listen to positioning sequences. Because the UE 1106 may not know its location, the base station 1102 may determine to allow the UE 1106 only to listen to positioning sequences. The base station 1102 may indicate to the UE 1106 the resource 960, the resource 980, and/or the resource 1060, for example, to enable to UE 1106 to receive positioning sequences and timing information. If the base station 1102 determines to allow the UE 1106 to participate in D2D ranging, the base station 1102 may determine a subset of the second set of resources to enable D2D ranging at the UE 1106.

In another aspect, if the base station 1102 allows both the UE 1104 and the UE 1106 to engage in D2D ranging, the base station 1102 may determine a first group (or a first subset) and a second group (or a second subset) of resources within the second set of resources. The first group of resources may be allocated to the UE 1104 for initiating D2D ranging. The second group of resources within the second set of resources may be allocated to the UE 1106 for initiating D2D ranging.

Having determined whether the UEs 1104, 1106 are allowed to engage in D2D positioning/ranging and the various related information, the base station 1102 may send a third message 1120 to the UE 1104 and a fourth message 1122 to the UE 1106 based on the determination. The third message 1120 may indicate whether the UE 1104 is allowed to participate in D2D ranging with the UE 1106 and/or D2D positioning. The fourth message 1122 may indicate whether the UE 1106 is allowed to participate in D2D ranging with the UE 1104 and/or D2D positioning. In an aspect, the third and fourth messages 1120, 1122 may be sent via unicast or via broadcast. In another aspect, information from the third and fourth messages 1120, 1122 may be broadcasted in the same message.

In an aspect, if the UE 1104 is allowed to participate in either D2D ranging or positioning, the third message 1120 may indicate one or more modes in which the UE 1104 is allowed to participate in D2D ranging and/or positioning. The third message 1120 may indicate whether the UE 1104 is allowed to transmit and listen to positioning signals/sequences or is allowed only to listen to positioning signals/sequences. The third message 1120 may indicate a subset of the first set of resources for broadcasting position information and positioning sequences. The third message 1120 may indicate a type of positioning sequence to broadcast. The third message 1120 may indicate a subset of the second set of resources for D2D ranging with the UE 1106. The subset of the second set of resources may include a first group of resources for the UE 1104 to initiate D2D ranging, and a second group of resources for the UE 1106 to initiate D2D ranging.

In an aspect, the UE 1104 may transmit a second resource message to the UE 1106 that indicates the second group of resources allocated to the UE 1106 for initiating D2D ranging. Although the base station 1102 may indicate the second group of resources to the UE 1106, in some instances, the UE 1106 may be out of the coverage area of the base station 1102. As such, the UE 1106 may learn of the second group of resources from the UE 1104. In this aspect, if the UE 1106 is out of coverage, the base station 1102 may not receive a request to initiate D2D ranging from the UE 1106. However, if the base station 1102 authorized the UE 1104 to initiate D2D ranging with the UE 1106, then the base station 1102 may also authorize the UE 1106 to initiate D2D ranging with the UE 1104 even without receiving a request to range from the UE 1106.

Similarly, if the UE 1106 is allowed to participate in D2D ranging and positioning, the fourth message 1122 may indicate one or more modes in which the UE 1106 is allowed to participate in D2D ranging and/or positioning. The fourth message 1122 may indicate that the UE 1106 is allowed only to listen to positioning signals/sequences. The fourth message 1120 may indicate the resource 960 for receiving broadcasted position information and the resource 980 for receiving broadcasted position information, timing information, etc. Alternatively, the fourth message 1122 may indicate the resource 1060 for receiving broadcasted position information. The fourth message 1122 may indicate a subset of the second set of resources for D2D ranging with the UE 1104.

Upon receiving the third message 1120, the UE 1104 may perform 1124 D2D positioning, as described in FIG. 9A-B or 10A-B, and/or D2D ranging. To perform D2D ranging, at time $t_1$, the UE 1104 may transmit or broadcast a first sequence (e.g., an assigned sequence such as Zadoff Chu sequence) on an assigned resource. Assuming the UE 1104 has a timing offset of $\epsilon$, the actual time at which the first sequence was transmitted may be $t_1+\epsilon$. The UE 1106 may wait for a period of time, $\Delta t$, after receiving the first sequence before transmitting a second sequence. The UE 1106 may transmit the second sequence and also indicate $\Delta t$ (or indicate the equivalent, such as when the first sequence was received and when the second sequence was transmitted). The UE 1104 may receive the second sequence at the actual time $t_2+\epsilon$. Referring to the Eqs. 27-29 below, the UE 1104 may determine the distance d between the UE 1104 and the UE 1106:

$$(t_2 + \varepsilon) - (t_1 + \varepsilon) = 2\left(\frac{d}{c}\right) + \Delta t \quad \text{(Eq. 27)}$$

$$t_2 - t_1 = 2\left(\frac{d}{c}\right) + \Delta t \quad \text{(Eq. 28)}$$

$$d = \frac{(t_2 - t_1 - \Delta t)c}{2} \quad \text{(Eq. 29)}$$

Referring to the Eqs. 27-29 above, (d/c) may be the propagation delay between the UEs 1104, 1106. By taking the difference between $t_2$ and $t_1$, the timing offsets cancel. Knowing $\Delta t$ (or its equivalent), the UE 1104 may solve for distance d.

Figure 12:
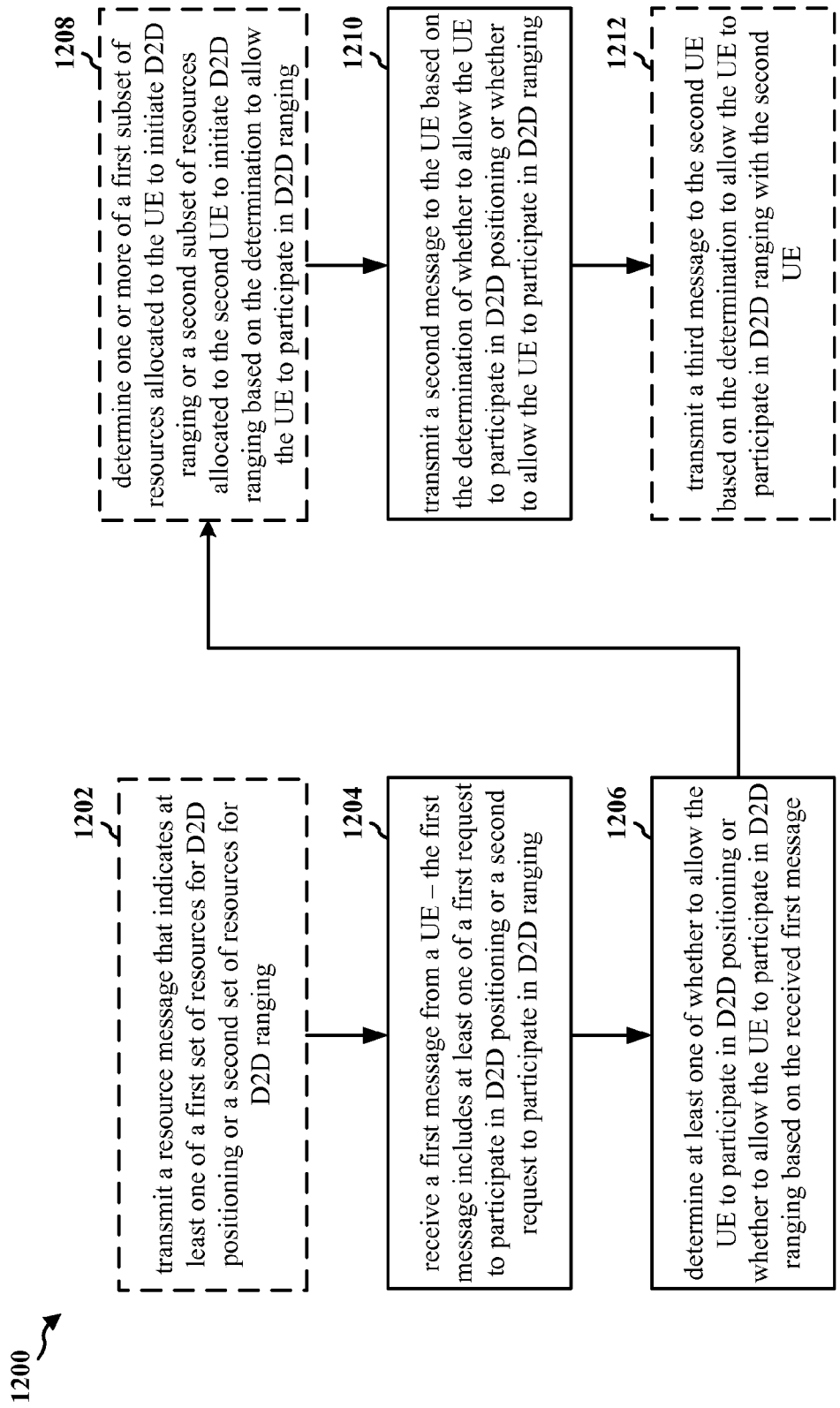
FIG. 12 is a flowchart of a method of wireless communication.

FIG. 12 is a flowchart 1200 of a method of wireless communication. The method may be performed by a base station (e.g., an eNB, the base station 1102, the apparatus 1402/1402').

At 1202, the base station may transmit a resource message that indicates at least one of a first set of resources for D2D positioning or a second set of resources for D2D ranging. For example, referring to FIG. 11, the base station 1102 may transmit the resource message 1114 that indicates a first set of resources (e.g., the set of resources 950) for D2D positioning and a second set of resources for D2D ranging.

At 1204, the base station may receive a first message from a UE. The first message may include at least one of a first request to participate in D2D positioning or a second request to participate in D2D ranging. In an aspect, at least one of the first request to participate in D2D positioning or the second request to participate in D2D ranging may include a mode request to participate in D2D positioning or D2D ranging while the UE is in a connected mode or in an idle mode. For example, referring to FIG. 11, the base station 1102 receives the first message 1116 from the UE 1104. The first message 1116 includes a first request to participate in D2D positioning and a second request to participate in D2D ranging. The first request includes a mode request to participate in D2D positioning in RRC_IDLE mode and in RRC_CONNECTED mode. The second request includes a mode request to participate in D2D ranging while the UE 1104 is in RRC_CONNECTED mode.

At 1206, the base station may determine at least one of whether to allow the UE to participate in D2D positioning or whether to allow the UE to participate in D2D ranging based on the received first message. In one aspect, the determination may be based on whether sufficient resources exist for the UE to participate in D2D positioning or D2D ranging (e.g., whether allow the D2D signaling would cause excessive interference or whether the quota for D2D signaling has been met or exceeded). In another aspect, the determination may include whether to allow the UE to participate in D2D positioning while the UE is in at least one of the connected mode or the idle mode. In another aspect, the determination may include whether to allow the UE to participate in D2D ranging while the UE is in at least one of the connected mode or the idle mode. In another aspect, the determination includes determining whether the UE is only allowed to listen to D2D positioning signals or whether the UE is allowed to transmit D2D positioning signals. For example, referring to FIG. 11, the base station 1102 may determine to allow the UE 1104 to participate in D2D positioning and D2D ranging by identifying resources for D2D signaling and by determining that sufficient resources exist for D2D positioning and/or ranging. The base station 1102 may determine to allow the UE 1104 to participate in D2D positioning in RRC_IDLE and RRC_CONNECTED modes, and to allow the UE 1104 to participate in D2D ranging while in RRC_CONNECTED mode. The base station 1102 may determine to allow the UE 1104 to listen to and to transmit D2D positioning sequences. The base station 1102 may determine the resources on which the UE 1104 may perform D2D positioning. For example, the base station 1102 may determine the resources 960, 970 (e.g., a subset of the set of resources 950) on which the UE 1104 may perform D2D positioning broadcast location information and positioning sequences, respectively. In an aspect, the resource 970 may be identified by a resource ID. The base station 1102 may determine that the UE 1104 may broadcast a Zadoff Chu positioning sequence.

At 1208, the base station may determine one or more of a first subset of resources allocated to the UE to initiate D2D ranging or a second subset of resources allocated to the second UE to initiate D2D ranging based on the determination to allow the UE to participate in D2D ranging. For example, referring to FIG. 11, the base station 1102 may determine a first subset of resources of the second set of resources and a second subset of resources of the second set of resources allocated to the UEs 1104, 1106, respectively, to participate in D2D ranging. The first subset of resources enables the UE 1104 to initiate D2D ranging with the UE 1106. The second subset of resources enables the UE 1106 to initiate D2D ranging with the UE 1104. The base station 1102 may determine the two subsets of resources by identifying the available resources for D2D ranging and determine whether allocating additional resources for D2D ranging would cause excessive interference. If not, the base station 1102 may apportion or allocate the first subset to the UE 1104 and/or the second subset to the UE 1106. In an aspect, the base station 1102 may determine that Zadoff Chu sequences are to be used for D2D ranging.

At 1210, the base station may transmit a second message to the UE based on the determination of whether to allow the UE to participate in D2D positioning or whether to allow the UE to participate in D2D ranging. With respect to D2D positioning, the second message may indicate a subset of resources for transmitting the D2D positioning signals and/or a type of sequence for D2D positioning. With respect to D2D ranging, the second message may indicate a first and/or second subset of the second set of resources for D2D ranging. For example, referring to FIG. 11, the base station 1102 may transmit the third message 1120 (e.g., the second message) to the UE 1104 based on the determination to allow the UE 1104 to participate in D2D positioning and D2D ranging. The third message 1120 may indicate the resources 960, 970 for D2D positioning. The resource 960 may be used for broadcasting position information and the resource 970 may be used for transmitting a Zadoff Chu positioning sequence, and the root index/cyclic shifts of the Zadoff Chu sequence may be indicated by the base station 1102. The third message 1120 may indicate that the UE 1104 may both listen to and transmit positioning sequences/signals. The third message 1120 may indicate that the UE 1104 may perform D2D positioning in the RRC_IDLE and RRC_CONNECTED modes. For D2D ranging, the third message 1120 may indicate that the UE 1104 may participate in D2D ranging while in RRC_CONNECTED mode. The third message 1120 may indicate a first subset (or group) and a second subset of the second set of resources to be used for D2D ranging. The first subset may be used by the UE 1104 to initiate D2D ranging, and the second subset may be used by the UE 1106 to initiate D2D ranging.

At 1212, the base station may transmit a third message to the second UE based on the determination to allow the UE to participate in D2D ranging with the second UE. For example, referring to FIG. 11, the third message may be the fourth message 1122 and the second UE may be the UE 1106. In this example, the base station 1102 may transmit the fourth message 1122 to the UE 1106 based on the determination to allow the UEs 1104, 1106 to perform D2D ranging. The fourth message 1122 may indicate the second subset of the second set of resources that may be used by the UE 1106 to initiate D2D ranging with the UE 1104.

Figure 13:
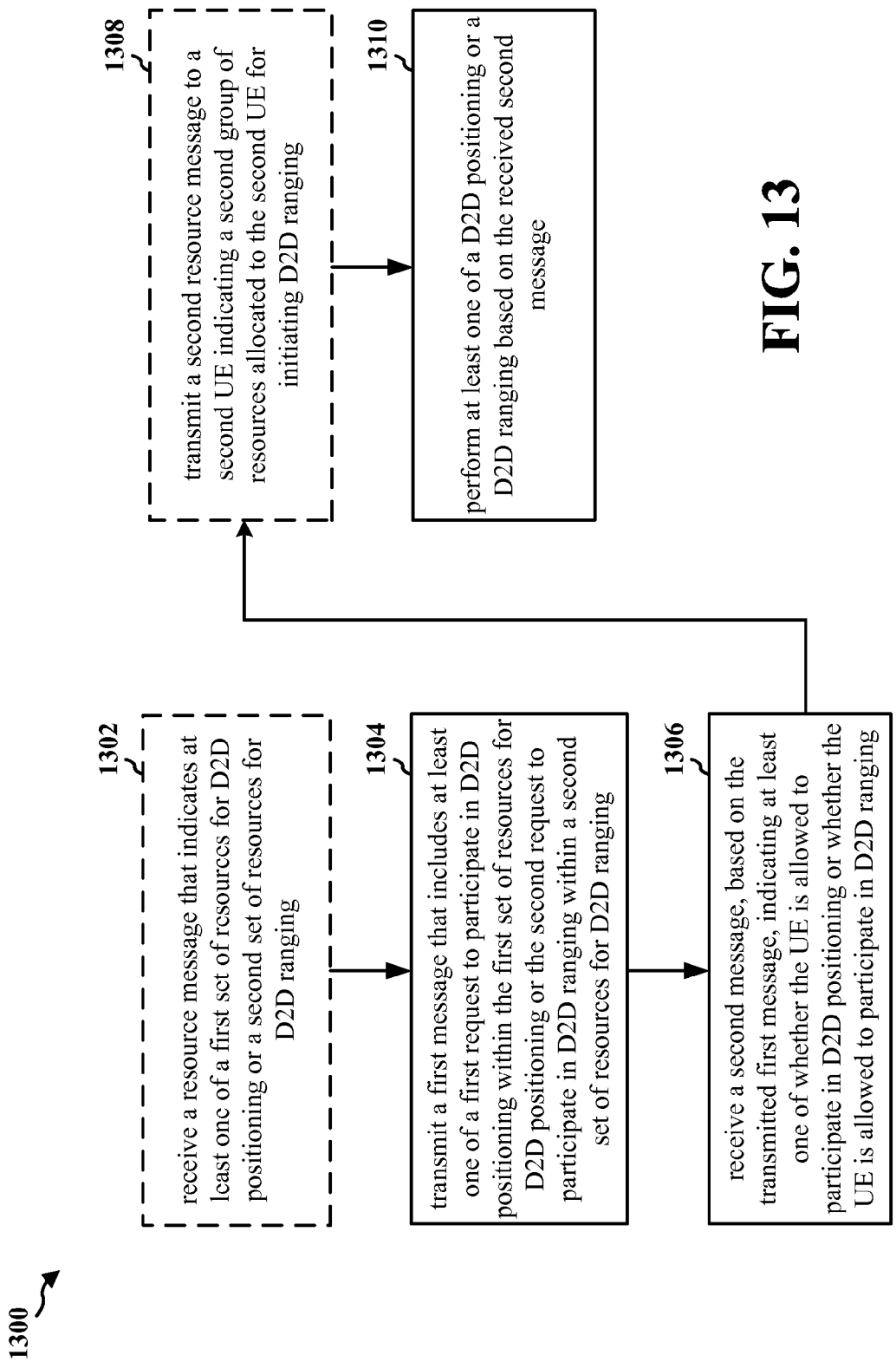
FIG. 13 is a flowchart of a method of wireless communication.

FIG. 13 is a flowchart 1300 of a method of wireless communication. The method may be performed by a UE (e.g., the UEs 1104, 1106, the apparatus 1602/1602').

At 1302, the UE may receive a resource message that indicates at least one of the first set of resources for D2D positioning or the second set of resources for D2D ranging. For example, referring to FIG. 11, the UE 1106 may receive the resource message 1114 that indicates a first set of resources (e.g., the set of resources 950 or the set of resources 1050) for D2D positioning and a second set of resources for D2D ranging.

At 1304, the UE may transmit a first message that includes at least one of a first request to participate in D2D positioning within a first set of resources for D2D positioning or a second request to participate in D2D ranging within a second set of resources for D2D ranging. In an aspect, the at least one of the first request to participate in D2D positioning or the second request to participate in D2D ranging may include a mode request to participate in D2D positioning or D2D ranging while the UE is in a connected mode or in an idle mode. For example, referring to FIG. 11, the UE may be the UE 1106 and the first message may be the second message 1118. In this example, the UE 1106 may transmit the second message 1118 that includes a first request to participate in D2D positioning within the set of resources 950 and a second request to participate in D2D ranging within a second set of resources for D2D ranging. The first request to participate in D2D positioning may include a mode request to participate in D2D positioning while in RRC_CONNECTED and RRC_IDLE mode and to participate in D2D ranging while in RRC_CONNECTED mode. The second request to participate in D2D ranging may include an ID associated with the UE 1104 to indicate that the D2D ranging is with the UE 1104.

At 1304, the UE may receive a second message, based on the transmitted first message, indicating at least one of whether the UE is allowed to participate in D2D positioning or whether the UE is allowed to participate in D2D ranging. In an aspect, the second message may indicate one or more of a subset of the first set of resources for D2D positioning or a subset of the second set of resources for D2D ranging. The subset of the second set of resources for D2D ranging may include a first group of resources allocated to the UE for initiating D2D ranging and a second group of resources allocated to a second UE for initiating D2D ranging. The second message may indicate a type of sequence for D2D ranging and/or D2D positioning. For example, referring to FIG. 11, the UE 1106 may receive the fourth message 1122 based on the second message 1118 transmitted to the base station 1102. The fourth message 1122 may indicate that the UE 1106 is allowed to participate in D2D positioning and D2D ranging. The fourth message 1122 may indicate the set of resources 950 for D2D positioning. In particular, the fourth message 1122 may indicate the resource 960 for receiving broadcasted position information. The fourth message 1122 may indicate that, while in RRC_CONNECTED and RRC_IDLE mode, the UE 1006 may only listen to broadcasted positioning sequences but may not transmit positioning sequences. The fourth message 1122 may indicate that the UE 1106 may perform D2D ranging with the UE 1104 and indicate a first group of resources of the second set of resources allocated to the UE 1106 for initiating D2D ranging and a second group of resources of the second set of resources allocated to the UE 1104 for initiating D2D ranging. The fourth message 1122 may indicate the Zadoff Chu sequence for D2D positioning and ranging.

At 1308, the UE may transmit a second resource message to a second UE indicating a second group of resources allocated to the second UE for initiating D2D ranging. For example, referring to FIG. 11, the UE 1106 may transmit to the UE 1104 another resource message that indicates the second group of resources of the second set of resources allocated to the UE 1104 for initiating D2D ranging.

At 1310, the UE may perform at least one of a D2D positioning or a D2D ranging based on the received second message. For example, referring to FIG. 11, the UE 1106 may perform D2D positioning according to the methods disclosed in FIG. 9A-B or 10A-B. In an example, if the UE 1106 does not know its position, the UE 1106 may determine its position based on signals received from reference UEs and/or super reference UEs as described in FIGS. 9A and 10A. In another example, if the UE 1106 is a reference UE or super reference UE, then the UE 1106 may broadcast position information, sequences, and/or timing information as described in FIGS. 9A and 10A. In yet another example, if the UE 1106 is to perform D2D ranging, then the UE 1106 may transmit an assigned sequence (e.g., a Zadoff Chu sequence) on an assigned resource in the second set of resources to the UE 1104 and receive another sequence from the UE 1104. Based on the time at which the sequence was transmitted to the UE 1104 and on the time at which the sequence was received from the UE 1104, the UE 1106 may determine the distance between the UE 1106 and the UE 1104.

Figure 14:
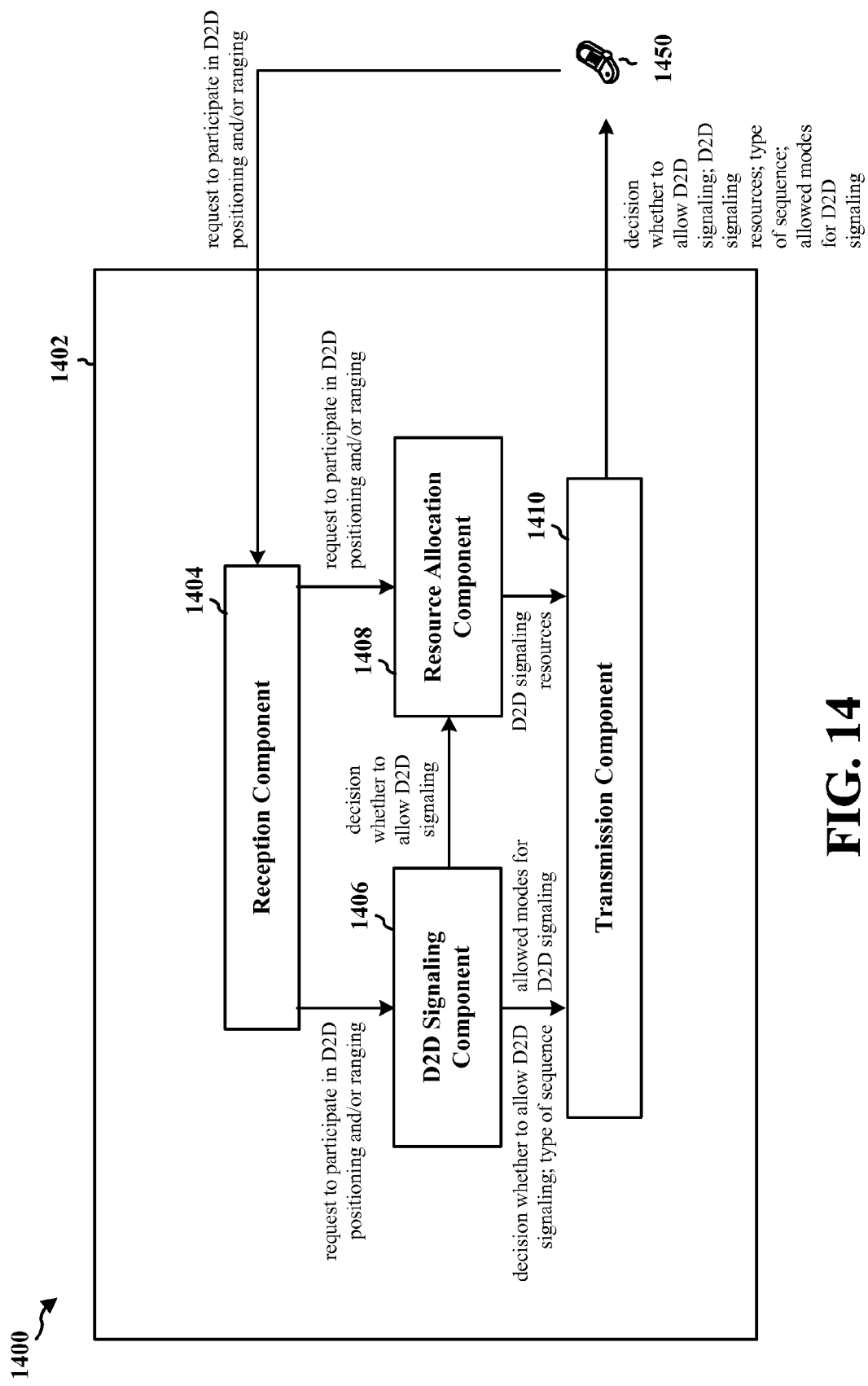
FIG. 14 is a conceptual data flow diagram illustrating the data flow between different modules/means/components in an exemplary apparatus.

FIG. 14 is a conceptual data flow diagram 1400 illustrating the data flow between different means/components in an exemplary apparatus 1402. The apparatus may be a base station (e.g., an eNB). The apparatus includes a reception component 1404, a D2D signaling component 1406, and a resource allocation component 1408, and a transmission component 1410. The reception component 1404 may be configured to receive a first message from a UE 1450, and the first message may include at least one of a first request to participate in D2D positioning or a second request to participate in D2D ranging. The D2D signaling component 1406 may be configured to determine at least one of whether to allow the UE 1450 to participate in D2D positioning or whether to allow the UE 1450 to participate in D2D ranging based on the received first message. The transmission component 1410 may be configured to transmit a second message to the UE 1450 based on the determination. In one configuration, the transmission component 1410 may be configured to transmit a resource message that indicates at least one of a first set of resources for D2D positioning or a second set of resources for D2D ranging. In an aspect, the at least one of the first request to participate in D2D positioning or the second request to participate in D2D ranging may include a mode request to participate in D2D positioning or D2D ranging while the UE 1450 is in a connected mode or in an idle mode. In another configuration, the D2D signaling component 1406 may be configured to determine of the at least one of whether to allow the UE 1450 to participate in D2D positioning or whether to allow the UE 1450 to participate in D2D ranging by determining whether to allow the UE 1450 to participate in D2D positioning while the UE 1450 is in at least one of the connected mode or the idle mode and/or by determining whether to allow the UE 1450 to participate in D2D ranging while the UE 1450 is in at least one of the connected mode or the idle mode. In another configuration, the D2D signaling component 1406 may be configured to determine whether the UE 1450 is only allowed to listen to D2D positioning signals and to determine whether the UE 1450 is allowed to transmit D2D positioning signals. In an aspect, the UE 1450 may be allowed to transmit D2D positioning signals, and the second message may indicate a subset of resources for transmitting the D2D positioning signals. In another aspect, the second message may indicate a type of sequence for D2D positioning. In another configuration, the transmission component 1410 may be configured to transmit a third message to the second UE based on the determination to allow the UE 1450 to participate in D2D ranging with the second UE. In this configuration, the second request to participate in D2D ranging may include an identifier associated with the second UE. In another configuration, the resource allocation component 1408 may be configured to determine one or more of a first subset of resources allocated to the UE 1450 to initiate D2D ranging or a second subset of resources allocated to the second UE to initiate D2D ranging based on the determination (e.g., by the D2D signaling component 1406) to allow the UE 1450 to participate in D2D ranging. In another aspect, the second message may include one or more of the first subset of resources or the second subset of resources for D2D ranging. In another aspect, the third message may include the second subset of resources for D2D ranging. In another aspect, at least one of the second message or the third message may indicate a type of sequence for D2D ranging.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
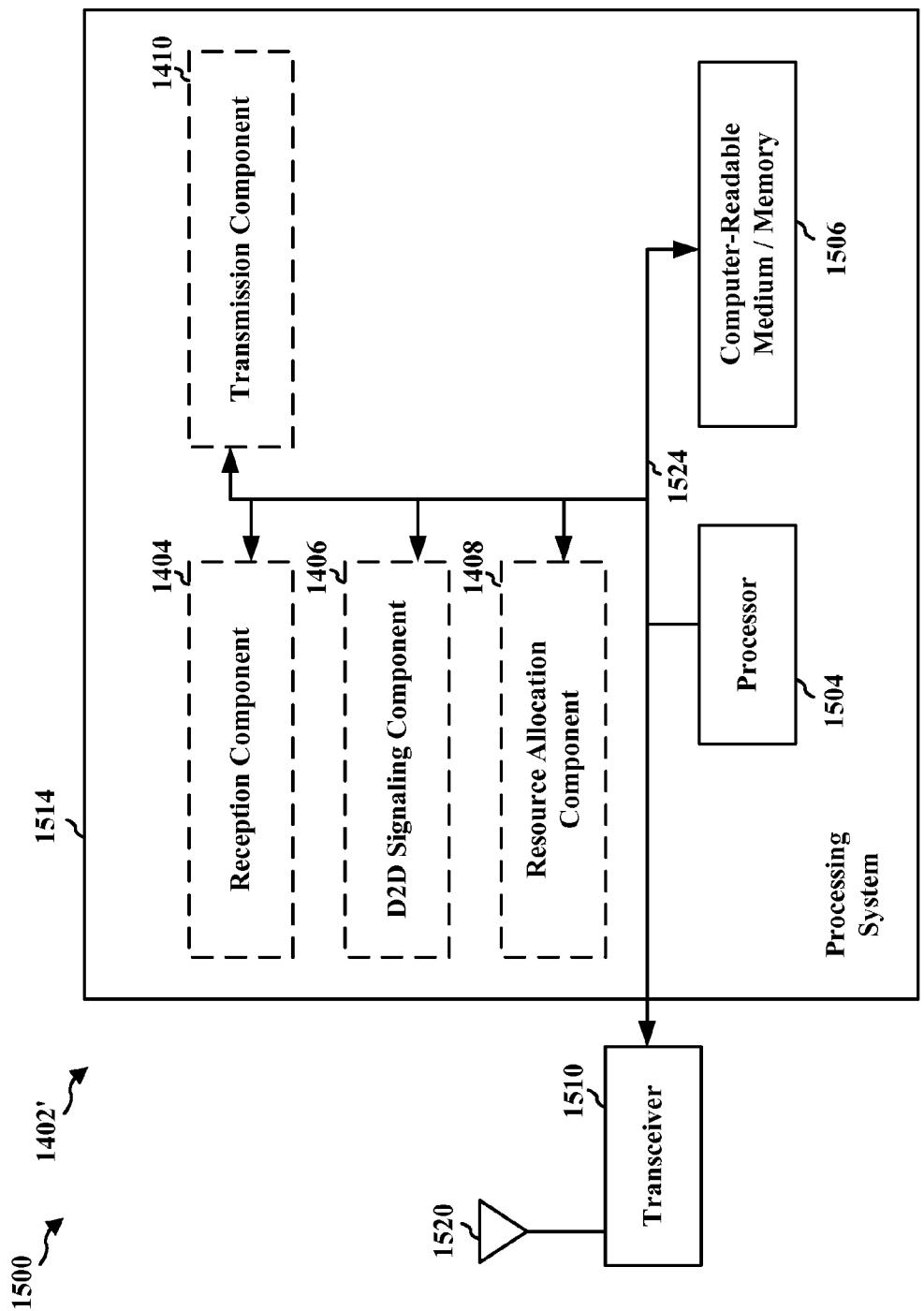
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1410, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system further includes at least one of the components 1404, 1406, 1408, 1410. The components may be software components running in the processor 1504, resident/stored in the computer readable medium/memory 1506, one or more hardware components coupled to the processor 1504, or some combination thereof. The processing system 1514 may be a component of the eNB 610 and may include the memory 676 and/or at least one of the TX processor 616, the RX processor 670, and the controller/processor 675.

In one configuration, the apparatus 1402/1402' for wireless communication includes means for receiving a first message from a UE. The first message may include at least one of a first request to participate in D2D positioning or a second request to participate in D2D ranging. The apparatus includes means for determining at least one of whether to allow the UE to participate in D2D positioning or whether to allow the UE to participate in D2D ranging based on the received first message. The apparatus includes means for transmitting a second message to the UE based on the determination. In one configuration, the apparatus may include means for transmitting a resource message that indicates at least one of a first set of resources for D2D positioning or a second set of resources for D2D ranging. In an aspect, the at least one of the first request to participate in D2D positioning or the second request to participate in D2D ranging may include a mode request to participate in D2D positioning or D2D ranging while the UE is in a connected mode or in an idle mode. In another configuration, the means for determining the at least one of whether to allow the UE to participate in D2D positioning or whether to allow the UE to participate in D2D ranging is configured to perform one or more of determining whether to allow the UE to participate in D2D positioning while the UE is in at least one of the connected mode or the idle mode or determining whether to allow the UE to participate in D2D ranging while the UE is in at least one of the connected mode or the idle mode. In another configuration, the means for determining the at least one of whether to allow the UE to participate in D2D positioning or whether to allow the UE to participate in D2D ranging is configured to determine whether the UE is only allowed to listen to D2D positioning signals and to determine whether the UE is allowed to transmit D2D positioning signals. In another aspect, the UE may be allowed to transmit D2D positioning signals, and the second message may indicate a subset of resources for transmitting the D2D positioning signals. In another aspect, the second message may indicate a type of sequence for D2D positioning. In another configuration, the apparatus may include means for transmitting a third message to the second UE based on the determination to allow the UE to participate in D2D ranging with the second UE. In this configuration, the second request to participate in D2D ranging may include an identifier associated with a second UE. In another configuration, the apparatus may include means for determining one or more of a first subset of resources allocated to the UE to initiate D2D ranging or a second subset of resources allocated to the second UE to initiate D2D ranging based on the determination to allow the UE to participate in D2D ranging. In another aspect, the second message may include one or more of the first subset of resources or the second subset of resources for D2D ranging. In another aspect, the third message may include the second subset of resources for D2D ranging. In yet another aspect, at least one of the second message or the third message indicates a type of sequence for D2D ranging.

The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 16:
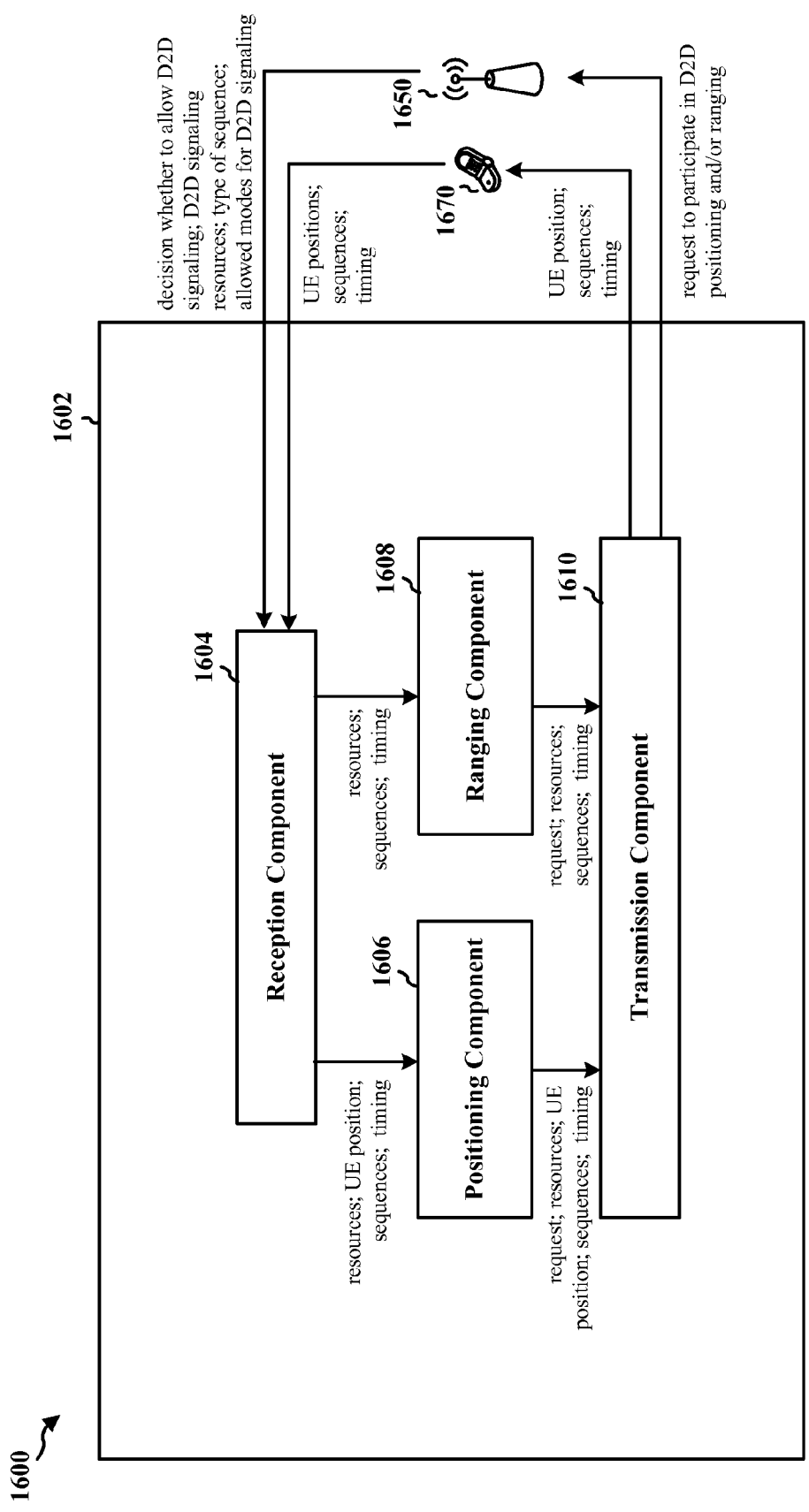
FIG. 16 is a conceptual data flow diagram illustrating the data flow between different modules/means/components in an exemplary apparatus.

FIG. 16 is a conceptual data flow diagram 1600 illustrating the data flow between different means/components in an exemplary apparatus 1602. The apparatus may be a UE. The apparatus includes a reception component 1604, a positioning component 1606, a ranging component 1608, and a transmission component 1610. The transmission component 1610 may be configured to transmit, to a base station 1650, a first message that includes at least one of a first request to participate in D2D positioning within a first set of resources for D2D positioning or a second request to participate in D2D ranging within a second set of resources for D2D ranging. The reception component 1604 may be configured to receive a second message, based on the transmitted first message, indicating at least one of whether the apparatus is allowed to participate in D2D positioning or whether the apparatus is allowed to participate in D2D ranging. The positioning component 1606 may be configured to perform D2D positioning with a UE 1670, and the ranging component 1608 may be configured to perform D2D ranging with the UE 1670. In another configuration, the reception component 1604 may be configured to receive a resource message that indicates at least one of the first set of resources for D2D positioning or the second set of resources for D2D ranging. In an aspect, the at least one of the first request to participate in D2D positioning or the second request to participate in D2D ranging may include a mode request to participate in D2D positioning or D2D ranging while the apparatus is in a connected mode or in an idle mode. In another aspect, the second message may indicate one or more of a subset of the first set of resources for D2D positioning or a subset of the second set of resources for D2D ranging. In another aspect, the subset of the second set of resources for D2D ranging may include a first group of resources allocated to the apparatus for initiating D2D ranging and a second group of resources allocated to a second UE for initiating D2D ranging. In another configuration, the transmission component 1610 may be configured to transmit a second resource message to the second UE indicating the second group of resources allocated to the second UE for initiating D2D ranging. In another aspect, the second message may indicate a type of sequence for D2D ranging.

The apparatus may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
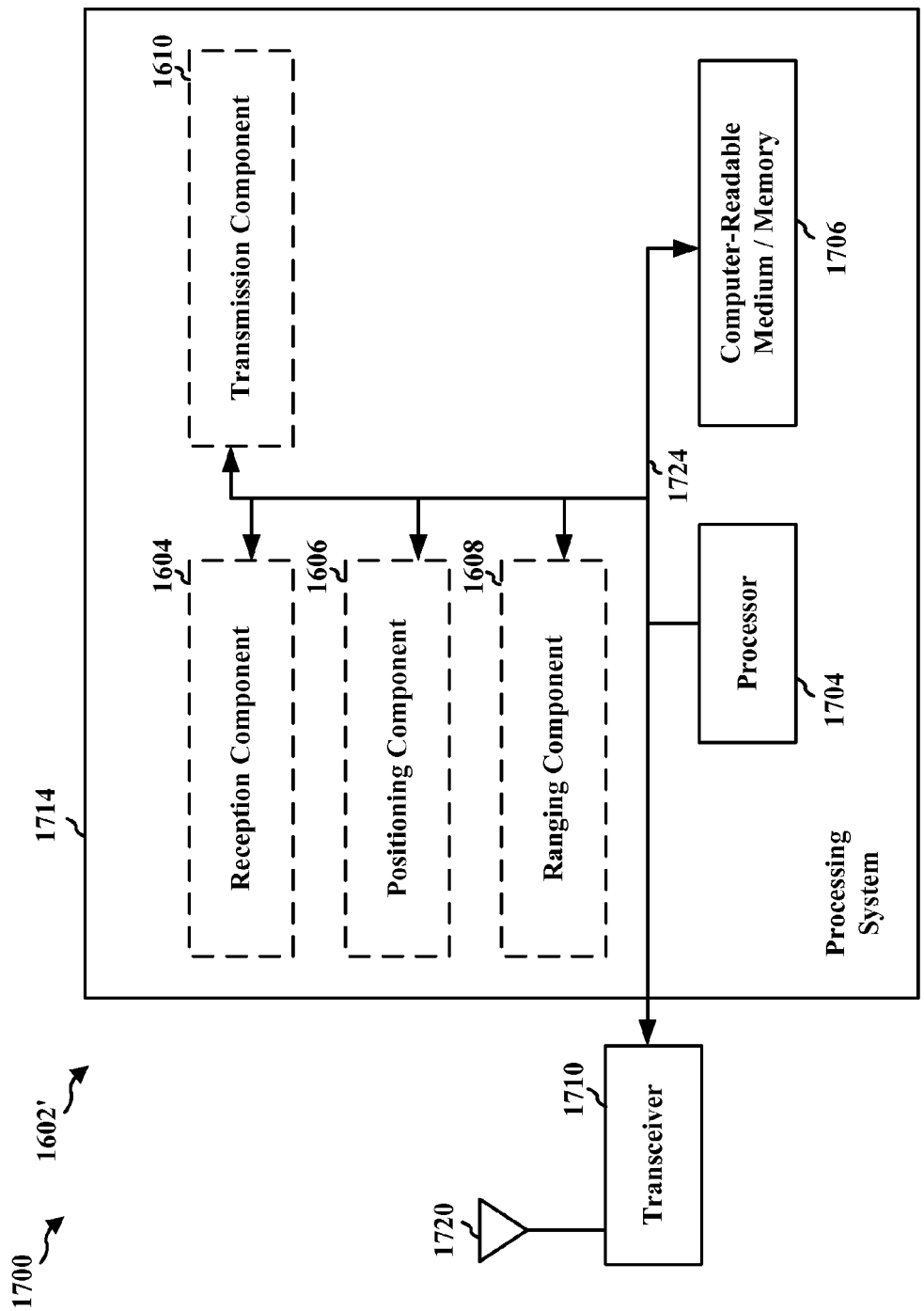
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1610, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system further includes at least one of the components 1604, 1606, 1608, 1610. The components may be software components running in the processor 1704, resident/stored in the computer readable medium/memory 1706, one or more hardware components coupled to the processor 1704, or some combination thereof. The processing system 1714 may be a component of the UE 650 and may include the memory 660 and/or at least one of the TX processor 668, the RX processor 656, and the controller/processor 659.

In one configuration, the apparatus 1602/1602' for wireless communication includes means for transmitting a first message that includes at least one of a first request to participate in D2D positioning within a first set of resources for D2D positioning or a second request to participate in D2D ranging within a second set of resources for D2D ranging. The apparatus includes means for receiving a second message, based on the transmitted first message, indicating at least one of whether the apparatus is allowed to participate in D2D positioning or whether the apparatus is allowed to participate in D2D ranging. The apparatus includes means for performing at least one of a D2D positioning or a D2D ranging based on the received second message. The apparatus may include means for receiving a resource message that indicates at least one of the first set of resources for D2D positioning or the second set of resources for D2D ranging. In an aspect, the at least one of the first request to participate in D2D positioning or the second request to participate in D2D ranging may include a mode request to participate in D2D positioning or D2D ranging while the apparatus is in a connected mode or in an idle mode. In another aspect, the second message may indicate one or more of a subset of the first set of resources for D2D positioning or a subset of the second set of resources for D2D ranging. In another aspect, the subset of the second set of resources for D2D ranging may include a first group of resources allocated to the apparatus for initiating D2D ranging and a second group of resources allocated to a second UE for initiating D2D ranging. In another configuration, the apparatus may include means for transmitting a second resource message to the second UE indicating the second group of resources allocated to the second UE for initiating D2D ranging. In another aspect, the second message may indicate a type of sequence for D2D ranging.

The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication by a base station, comprising:
   receiving a first message from a user equipment (UE), the first message comprising at least one of a first request to participate in device-to-device (D2D) positioning or a second request to participate in D2D ranging;
   determining at least one of whether to allow the UE to participate in D2D positioning or whether to allow the UE to participate in D2D ranging based on the received first message; and
   transmitting a second message to the UE based on the determination.

2. The method of claim 1, further comprising transmitting a resource message that indicates at least one of a first set of resources for D2D positioning or a second set of resources for D2D ranging.

3. The method of claim 1, wherein the at least one of the first request to participate in D2D positioning or the second request to participate in D2D ranging includes a mode request to participate in D2D positioning or D2D ranging while the UE is in a connected mode or in an idle mode.

4. The method of claim 3, wherein the determination of the at least one of whether to allow the UE to participate in D2D positioning or whether to allow the UE to participate in D2D ranging comprises one or more of:
   determining whether to allow the UE to participate in D2D positioning while the UE is in at least one of the connected mode or the idle mode; or
   determining whether to allow the UE to participate in D2D ranging while the UE is in at least one of the connected mode or the idle mode.

5. The method of claim 1, wherein the determination of the at least one of whether to allow the UE to participate in D2D positioning or whether to allow the UE to participate in D2D ranging comprises:
   determining whether the UE is only allowed to listen to D2D positioning signals; and
   determining whether the UE is allowed to transmit D2D positioning signals.

6. The method of claim 5, wherein the UE is allowed to transmit D2D positioning signals, and wherein the second message indicates a subset of resources for transmitting the D2D positioning signals.

7. The method of claim 6, wherein the second message indicates a type of sequence for D2D positioning.

8. The method of claim 1, wherein the second request to participate in D2D ranging includes an identifier associated with a second UE, the method further comprising:
   transmitting a third message to the second UE based on the determination to allow the UE to participate in D2D ranging with the second UE.

9. The method of claim 8, further comprising determining one or more of a first subset of resources allocated to the UE to initiate D2D ranging or a second subset of resources allocated to the second UE to initiate D2D ranging based on the determination to allow the UE to participate in D2D ranging.

10. The method of claim 9, wherein the second message includes one or more of the first subset of resources or the second subset of resources for D2D ranging.

11. The method of claim 9, wherein the third message includes the second subset of resources for D2D ranging.

12. The method of claim 9, wherein at least one of the second message or the third message indicates a type of sequence for D2D ranging.

13. A method of wireless communication by a user equipment (UE), comprising:
   transmitting a first message that comprises at least one of a first request to participate in device-to-device (D2D) positioning within a first set of resources for D2D positioning or a second request to participate in D2D ranging within a second set of resources for D2D ranging;
   receiving a second message, based on the transmitted first message, indicating at least one of whether the UE is allowed to participate in D2D positioning or whether the UE is allowed to participate in D2D ranging; and
   performing at least one of a D2D positioning or a D2D ranging based on the received second message.

14. The method of claim 13, further comprising receiving a resource message that indicates at least one of the first set of resources for D2D positioning or the second set of resources for D2D ranging.

15. The method of claim 13, wherein the at least one of the first request to participate in D2D positioning or the second request to participate in D2D ranging includes a mode request to participate in D2D positioning or D2D ranging while the UE is in a connected mode or in an idle mode.

16. The method of claim 13, wherein the second message indicates one or more of a subset of the first set of resources for D2D positioning or a subset of the second set of resources for D2D ranging.

17. The method of claim 16, wherein the subset of the second set of resources for D2D ranging includes a first group of resources allocated to the UE for initiating D2D ranging and a second group of resources allocated to a second UE for initiating D2D ranging.

18. The method of claim 17, further comprising transmitting a second resource message to the second UE indicating the second group of resources allocated to the second UE for initiating D2D ranging.

19. The method of claim 13, wherein the second message indicates a type of sequence for D2D ranging.

20. An apparatus for wireless communication, comprising:
a memory; and
at least one processor coupled to the memory and configured to:
receive a first message from a user equipment (UE), the first message comprising at least one of a first request to participate in device-to-device (D2D) positioning or a second request to participate in D2D ranging;
determine at least one of whether to allow the UE to participate in D2D positioning or whether to allow the UE to participate in D2D ranging based on the received first message; and
transmit a second message to the UE based on the determination.

21. The apparatus of claim 20, wherein the at least one processor is further configured to transmit a resource message that indicates at least one of a first set of resources for D2D positioning or a second set of resources for D2D ranging.

22. The apparatus of claim 20, wherein the at least one of the first request to participate in D2D positioning or the second request to participate in D2D ranging includes a mode request to participate in D2D positioning or D2D ranging while the UE is in a connected mode or in an idle mode.

23. The apparatus of claim 22, wherein the at least one processor is configured to determine the at least one of whether to allow the UE to participate in D2D positioning or whether to allow the UE to participate in D2D ranging by performing one or more of:

determining whether to allow the UE to participate in D2D positioning while the UE is in at least one of the connected mode or the idle mode; or
determining whether to allow the UE to participate in D2D ranging while the UE is in at least one of the connected mode or the idle mode.

24. The apparatus of claim 20, wherein the at least one processor is configured to determine the at least one of whether to allow the UE to participate in D2D positioning or whether to allow the UE to participate in D2D ranging by:
determining whether the UE is only allowed to listen to D2D positioning signals; and
determining whether the UE is allowed to transmit D2D positioning signals.

25. The apparatus of claim 20, wherein the second request to participate in D2D ranging includes an identifier associated with a second UE, and wherein the at least one processor is further configured to:
transmit a third message to the second UE based on the determination to allow the UE to participate in D2D ranging with the second UE.

26. The apparatus of claim 25, wherein the at least one processor is further configured to determine one or more of a first subset of resources allocated to the UE to initiate D2D ranging or a second subset of resources allocated to the second UE to initiate D2D ranging based on the determination to allow the UE to participate in D2D ranging.

27. An apparatus for wireless communication, the apparatus being a user equipment (UE), and comprising:
a memory; and
at least one processor coupled to the memory and configured to:
transmit a first message that comprises at least one of a first request to participate in device-to-device (D2D) positioning within a first set of resources for D2D positioning or a second request to participate in D2D ranging within a second set of resources for D2D ranging;
receive a second message, based on the transmitted first message, indicating at least one of whether the UE is allowed to participate in D2D positioning or whether the UE is allowed to participate in D2D ranging; and
perform at least one of a D2D positioning or a D2D ranging based on the received second message.

28. The apparatus of claim 27, wherein the at least one processor is further configured to receive a resource message that indicates at least one of the first set of resources for D2D positioning or the second set of resources for D2D ranging.

29. The apparatus of claim 27, wherein the second message indicates one or more of a subset of the first set of resources for D2D positioning or a subset of the second set of resources for D2D ranging.

30. The apparatus of claim 29, wherein the subset of the second set of resources for D2D ranging includes a first group of resources allocated to the UE for initiating D2D ranging and a second group of resources allocated to a second UE for initiating D2D ranging.

* * * * *